United States Patent
Ray

(10) Patent No.: US 12,198,004 B2
(45) Date of Patent: Jan. 14, 2025

(54) QUANTUM PARALLEL EVENT COUNTER

(71) Applicant: The Boeing Company, Chicago, IL (US)

(72) Inventor: Gary A. Ray, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 659 days.

(21) Appl. No.: 17/453,359

(22) Filed: Nov. 3, 2021

(65) Prior Publication Data
US 2022/0188684 A1    Jun. 16, 2022

Related U.S. Application Data

(60) Provisional application No. 63/123,639, filed on Dec. 10, 2020.

(51) Int. Cl.
*G06N 10/00* (2022.01)
*G06F 9/30* (2018.01)

(52) U.S. Cl.
CPC ......... *G06N 10/00* (2019.01); *G06F 9/30101* (2013.01)

(58) Field of Classification Search
CPC ............................ G06N 10/00; G06F 9/30101
USPC ........................................................ 716/100
See application file for complete search history.

(56) References Cited

U.S. PATENT DOCUMENTS

| | | | |
|---|---|---|---|
| 7,451,292 B2 | 11/2008 | Routt | |
| 2003/0005010 A1* | 1/2003 | Cleve | G06N 10/00 708/403 |
| 2009/0122956 A1* | 5/2009 | Janssen | G01T 1/2928 378/51 |
| 2015/0090893 A1* | 4/2015 | Spahn | G01T 1/17 250/394 |
| 2016/0314406 A1* | 10/2016 | Wiebe | G06N 10/00 |
| 2017/0316336 A1* | 11/2017 | Bocharov | G06N 10/20 |
| 2019/0258696 A1* | 8/2019 | Burchard | G06Q 99/00 |
| 2022/0156614 A1* | 5/2022 | Dalli | G06N 5/048 |
| 2022/0156620 A1* | 5/2022 | McDermott, III | H03K 19/195 |
| 2022/0382827 A1* | 12/2022 | Yalovetzky | G06F 17/16 |

OTHER PUBLICATIONS

Zalka, "Fast versions of Shor's quantum factoring algorithm," dated Jun. 24, 1998, 37 pages. https://arxiv.org/pdf/quant-ph/9806084.pdf.
Strubell, "An Introduction to Quantum Algorithms," COS498, 2011, 35 pages. https://strubell.github.io/doc/quantum_tutorial.pdf.

(Continued)

*Primary Examiner* — Jack Chiang
*Assistant Examiner* — Suchin Parihar
(74) *Attorney, Agent, or Firm* — Yee & Associates, P.C.

(57) ABSTRACT

A method, apparatus, and system for counting events. a set of quantum registers is reset. A Hadamard operator is applied to the set of quantum registers. A quantum instruction is executed on the set of quantum registers, wherein the quantum instruction incorporates a function for an event vector comprising events identified by bits. The Hadamard operator is applied to the set of quantum registers after executing the quantum instruction. The set of quantum registers is measured to form a measurement of the set of quantum registers. An approximate count of the events is determined using the measurement of the set of quantum registers.

29 Claims, 10 Drawing Sheets

(56) References Cited

OTHER PUBLICATIONS

Benchasattabuse et al., "Quantum Rough Counting and Its Application to Grover's Search Algorith," 2018 3rd International Conference on Computer and Communication Systems (ICCCS), IEEE, Apr. 27, 2018, pp. 21-24, 4 pages.
Extended European Search Report (EESR) dated Apr. 26, 2022, regarding Application No. EP 21206306, 8 pages.
Canadian Patent Office Examination Report, dated Feb. 22, 2024, regarding Application No. CA3137241, 5 pages.

\* cited by examiner

QUANTUM PARALLEL EVENT COUNTER

This application is related to and claims the benefit of priority of provisional U.S. Patent Application Ser. No. 63/123,639, entitled "Quantum Parallel Event Counter", filed on Dec. 10, 2020, which is hereby incorporated by reference.

BACKGROUND INFORMATION

1. Field

The present disclosure relates generally to an improved event counter and, in particular, to a method, apparatus, and system for counting events using a quantum event counter.

2. Background

An event counter is a device that can be used for multiple applications. An event counter can be, for example, frequency counters that count signal cycles. As another example, the event counter can be a radiation counter that counts particle impacts. In yet another example, the event counter can be a full-time counter that detects atomic events.

In counting events, conditioning of the events may be performed to place the events into a form that can be counted by the event counter. The conditioning of the events can include amplification, filtering, digitizing, or other types of conditioning depending on the type of event counter being used. The conditioning can also include converting mechanical energy to electrical energy or atomic excitation to photon detections using a transducer.

Events may occur at a substantially even rate. In other cases, burst of events may occur. Regardless of the rate at which the events occur, an event counter should be able to handle these different frequencies and which events can occur. As the rate at which events occur, counting these events may become more challenging. In some cases, the rate of events may increase to a level that cannot be counted by an event counter.

Therefore, it would be desirable to have a method and apparatus that take into account at least some of the issues discussed above, as well as other possible issues. For example, it would be desirable to have a method and apparatus that overcome a technical problem with counting events as the rate of the events increases.

SUMMARY

An embodiment of the present disclosure provides an event counting system comprising a computer system and a quantum processor in the computer system. The quantum processor is configured to reset a set of quantum registers. The quantum processor is configured to apply a Hadamard operator to the set of quantum registers. The quantum processor is configured to execute a quantum instruction on the set of quantum registers. The quantum instruction incorporates a function for an event vector comprising events identified by bits. The quantum processor is configured to apply the Hadamard operator to the set of quantum registers after executing the quantum instruction. The quantum processor is configured to measure the set of quantum registers to form a measurement of the set of quantum registers. The quantum processor is configured to determine an approximate count of the events using the measurement of the set of quantum registers.

Another embodiment of the present disclosure provides an event counting system comprising a computer system, a first set of quantum registers in the computer system, a second set of quantum registers in the computer system, and a quantum processor in the computer system. The quantum processor is configured to reset the first set of quantum registers and the second set of quantum registers. The quantum processor is configured to apply a Hadamard operator to the first set of quantum registers and the second set of quantum registers. The quantum processor is configured to execute a quantum instruction on the set of quantum registers. The quantum instruction incorporates a function for an event vector comprising events identified by bits in the event vector. The quantum processor is configured to execute a complementary quantum instruction on the second set of quantum registers. The complementary quantum instruction incorporates a complementary function that is complementary to the function for the event vector comprising the events identified by the bits in the event vector. The quantum processor is configured to apply the Hadamard operator to the first set of quantum registers after executing the quantum instruction. The quantum processor is configured to apply the Hadamard operator to the second set of quantum registers after executing the complementary quantum instruction. The quantum processor is configured to measure the first set of quantum registers and the second set of quantum registers to form a measurement of the first set of quantum registers and the second set of quantum registers. The quantum processor is configured to determine an approximate count of the events using the measurement.

Still another embodiment of the present disclosure provides a method for counting events. A set of quantum registers is reset. A Hadamard operator is applied to the set of quantum registers. A quantum instruction is executed on the set of quantum registers, wherein the quantum instruction incorporates a function for an event vector comprising events identified by bits. The Hadamard operator is applied to the set of quantum registers after executing the quantum instruction. The set of quantum registers is measured to form a measurement of the set of quantum registers. An approximate count of the events is determined using the measurement of the set of quantum registers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that events occurring at frequencies greater than 100 gigahertz can be challenging to count by currently available event counters. The illustrative embodiments recognize and take into account that with sequentially recurring events, proper accounting of these events involves using an event counter that operates as fast as the shortest time between these events. The illustrative embodiments recognize and take into account that currently available digital event counters currently cannot run faster than about 100 GHz.

Thus, the illustrative examples provide a method, apparatus, and system for counting events at a faster rate than possible with current event counters. For example, an event counter can implement quantum techniques to produce approximate event counts at a rate that is much faster as compared to current event counters.

In one illustrative example, a computer system can include a quantum processor. This quantum processor can comprise a quantum arithmetic logic unit (QALU). In one illustrative example, the quantum arithmetic logic unit can include a set of quantum registers and a quantum logic. The quantum logic can implement any number of independent unitary instructions that can be processed in parallel for the set of quantum registers. In other words, the quantum logic can process unitary instructions in one or more quantum registers in the set of quantum registers in parallel.

As used herein, a "set of" when used with reference to items, means one or more items. For example, a "set of quantum registers" is one or more quantum registers.

The illustrative examples provide a method, apparatus, and system for counting events. In one illustrative example, a set of quantum registers is reset. A Hadamard operator is applied to the set of quantum registers. A quantum instruction is executed on the set of quantum registers, wherein the quantum instruction incorporates a function for an event vector comprising events identified by bits. The Hadamard operator is applied to the set of quantum registers after executing the quantum instruction. The set of quantum registers is measured to form a measurement of the set of quantum registers. An approximate count of the events is determined using the measurement of the set of quantum registers.

Figure 1:
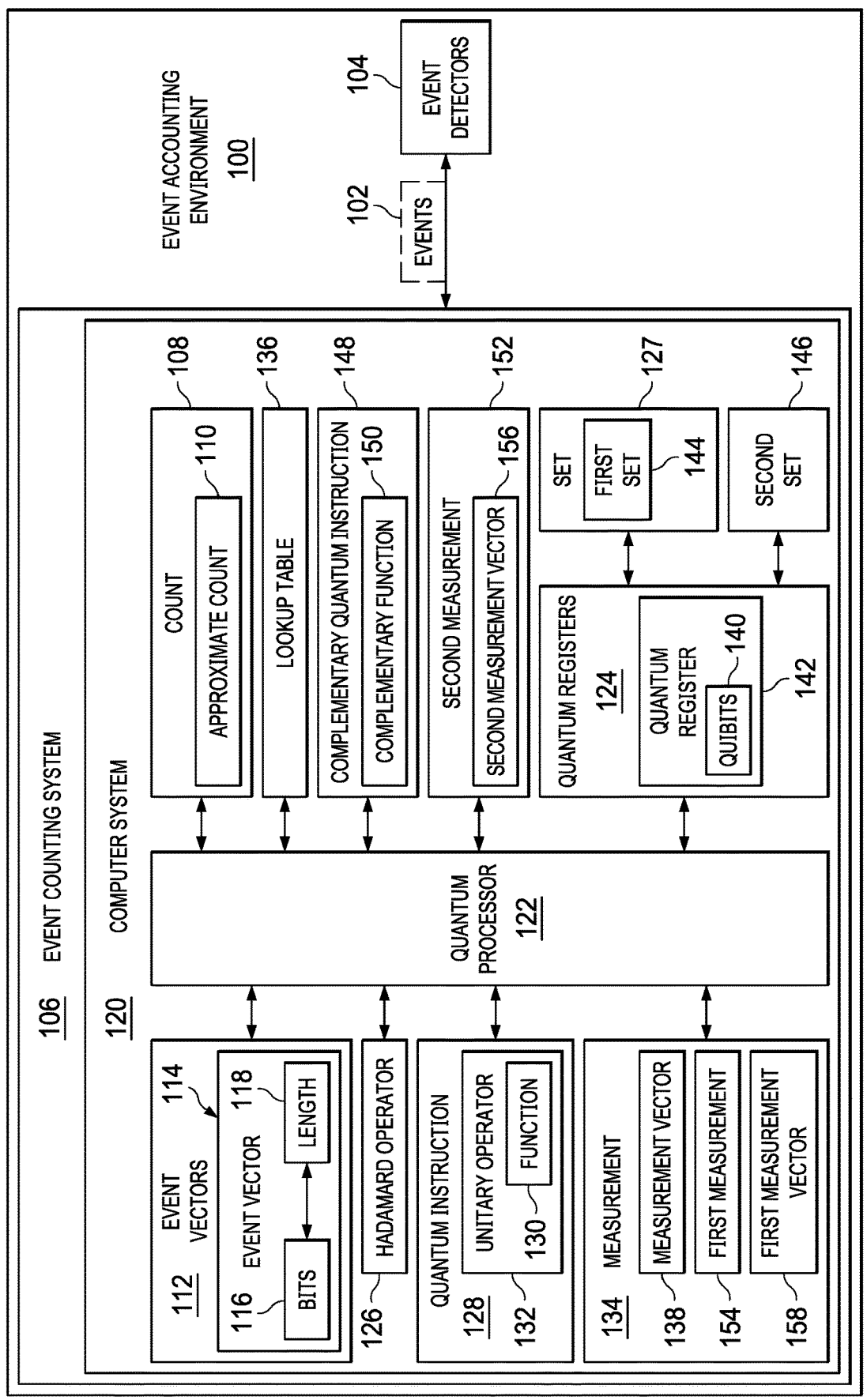
FIG. 1 is an illustration of a block diagram of an event counting environment in accordance with an illustrative embodiment.

With reference now to the figures and, in particular, with reference to FIG. 1, an illustration of a block diagram of an event counting environment is depicted in accordance with an illustrative embodiment. As depicted, event counting environment 100 is an environment in which events 102 can be generated by a set of event detectors 104. The set of event detectors 104 can be hardware, software, or a combination of the two. In this example, the set of event detectors 104 can be selected from at least one of a sensor, an event detector, a simulator detector, a virus scanner, a network scanner, a biosensor, an image sensor, a seismometer, or some other source that can generate events 102.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Event counting system 106 can count events 102 generated by the set of event detectors 104 to create count 108 of events 102. In this illustrative example, count 108 is approximate count 110 of events 102.

As depicted, events 102 are encoded into event vectors 112 for processing. In this illustrative example, event vector 114 in event vectors 112 comprises bits 116 with length 118. Event vector 114 can also be referred to as "E" in these examples. Length 118 indicates the number of bits 116 and can also be referred to as "n" in these illustrative examples with event vector being referred to as E(n).

In this illustrative example, event counting system 106 comprises a number of different components. As depicted, event counting system 106 includes computer system 120 and quantum processor 122. In this illustrative example, quantum processor 122 is located in computer system 120.

Quantum processor 122 can be implemented in software, hardware, firmware, or a combination thereof. When software is used, the operations performed by quantum processor 122 can be implemented in program code configured to run on hardware, such as a processor unit. When firmware is used, the operations performed by quantum processor 122 can be implemented in program code and data and stored in persistent memory to run on a processor unit. When hardware is employed, the hardware can include circuits that operate to perform the operations in quantum processor 122.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 120 is a physical hardware system and includes one or more data processing systems. When more than one data processing system is present in computer system 120, those data processing systems are in communication with each other using a communications medium. The communications medium can be a network. The data processing systems can be selected from at least one of a computer, a server computer, a tablet computer, or some other suitable data processing system.

As depicted, when hardware or hardware and software are used for quantum processor 122, the components in quantum processor 122 can be implemented using semiconductors may include quantum-based components such as quantum bits, quantum registers, quantum gates, and other components. Further, these quantum components used for quantum processor 122 can be a model running in computer system 120. Quantum processor 122 can perform quantum processes and can also perform non-quantum processes.

As depicted, quantum processor 122 is configured to configured perform a number of different operations that may include both quantum and non-quantum operations to determine approximate count 110 for events 102 in event vector 114.

In the illustrative example, quantum processor 122 can reset set 127 of quantum registers 124 in computer system 120. A quantum register can be comprised of qubits. A qubit can also be referred to as a quantum bit. Qubits can be a two-state or two-level quantum mechanical system. For example, qubits may have electrons at two levels that can be spin up and spin down. As another example, a polarization of a photon at two states can also be used in which a vertical polarization in a horizontal polarization is present. In this illustrative example, quantum mechanics enables a qubit to be in a coherent super position of both states simultaneously. A quantum register enables the performance of calculations through the manipulation of qubits in the quantum register.

As depicted, quantum processor 122 can apply Hadamard operator 126 to set 127 of quantum registers 124. Quantum processor 122 can execute quantum instruction 128 on set 127 of quantum registers 124. In executing quantum instruction 128, function 130 can be applied to the contents of each quantum register in set 127 of quantum registers 124.

In this illustrative example, function 130 can be a function performed on set 127 of quantum registers 124 and can be based on the content of event vector 114. In other words, function 130 performed on set 127 of quantum registers 124 can be based on the values for bits 116 in event vector 114. As a result, function 130 can be different for each event vector in event vectors 112 when the dates in event vectors 112 are different from each other.

For example, function 130 can be applied to perform a logic AND of first set of bits, qubits 140, in quantum register 142 in set 127 of quantum registers 124 that corresponds to a second set of bits, bits 116, in event vector 114 that indicate a presence of an event. Function 130 can be as follows:

$$f(x) = (\wedge_{i=1}^{n} x_i^{E_i})$$

wherein $E_i$ is an ith bit in event vector 114, n is a number of bits 116 in the event vector 114, $X_i$ is the ith bit in quantum register 142, and i is an index value.

In this illustrative example, quantum instruction 128 incorporates function 130 for event vector 114 comprising events 102 identified by bits 116. Quantum instruction 128 can comprise function 130 encoded in unitary operator 132 that can be executed by quantum processor 122.

Unitary operator 132 is an instruction that can be used in a quantum computer. In other words, function 130 can be incorporated into quantum instruction 128 enabling function 130 to be performed by quantum processor 122 when quantum instruction 128 is executed.

In this illustrative example, unitary operator 132 is a surjective bounded operator on a Hilbert space preserving the inner product. For example, unitary operator 132 can be a bounded linear operator U:H→H on a Hilbert space H that satisfies U*U=UU*=I, where U* is the adjoint of U, and I:H→H is the identity operator. Unitary operator 132 also can be a unitary operator that is a bounded linear operator U:H→H on a Hilbert space H for which the following hold: U is surjective and U preserves the inner product of the Hilbert space, H. In other words, for all vectors x and y in H, $(Ux,Uy)_H=(x,y)$.

As depicted, quantum processor 122 can apply Hadamard operator 126 to set 127 of quantum registers 124 after executing quantum instruction 128. Quantum processor 122 can then measure set 127 of quantum registers 124 to form measurement 134 of set 127 of quantum registers 124.

Quantum processor 122 can then determine approximate count 110 of events 102 using measurement 134 of set 127 of quantum registers 124. In determining approximate count 110 from measurements 134, quantum processor 122 can determine approximate count 110 of events 102 as follows:

$$C(E) = F^{-1} C(r)/M$$

where $C(r)$ is a count of logic ones in a measurement vector in the measurement, and M is a number of quantum registers. $F^{-1}$ is the inverse of $F(c)$ which is as follows:

$$F(c) = \left( \left( \sum_{i=c+1}^{L(E)} 2^i \right) \Big/ 2^n \right)^2$$

where $L(E)$ is the length of the event vector, i is an index value, n is the number of qbits, c is the event count.

In another illustrative example, quantum processor 122 can determine approximate count 110 of events 102 using lookup table 136. For example, quantum processor 122 can be configured to determine approximate count 110 of events 102 using lookup table 136. In this example, lookup table 136 can be used to identify approximate count 110 of events 102 from a number of logic 1s in measurement vector 138 in measurement 134. In other words, the number of logic ones in measurement vector 138 are used to find approximate count 110 for those input bits in lookup table 136. For example, measurement vector 138 can be used as an input into lookup table 136. The bits in measurement vector 138 can be used to obtain approximate count 110 in lookup table 136 that corresponds to the bits in measurement vector 138.

In this illustrative example, each bit is the result of measuring a quantum register in quantum registers 124. For example, if the number of output bits is 6, then the number of quantum registers 124 measured is 6.

In illustrative example, quantum processor 122 can also perform other operations including, for example, encoding events 102 into event vector 114. As another example, quantum processor 122 can generate function 130 for event vector 114 based on event vector 114, which comprises bits 116 that identify events 102. As yet another example, quantum processor 122 can generate quantum instruction 128 incorporating function 130 for event vector 114 comprising events 102 identified by bits 116.

In yet another example, set 127 of quantum registers 124 is first set 144 of quantum registers 124. In this example, second set 146 of quantum registers is present. With second set 146 of quantum registers 124, the same operations performed on first set 144 of quantum registers 124 can be performed on second set 146 of quantum registers 124.

For example, quantum processor 122 can reset second set 146 of quantum registers 124 and apply Hadamard operator 126 to second set 146 of quantum registers 124.

In this example, quantum processor 122 can execute complementary quantum instruction 148 on second set 146 of quantum registers 124 instead of quantum instruction 128. As depicted, complementary quantum instruction 148 incorporates complementary function 150 that is complementary to function 130 for event vector 114 comprising events 102 identified by bits 116 in event vector 114. For example, complementary function 150 can be as follows:

$$f_c(x) = \left( \bigwedge_{i=1}^{n} x_i^{not(E_i)} \right)$$

where $E_i$ is an ith bit in event vector 114, n is a number of bits 116 in event vector 114, $X_i$ is the ith bit in quantum register 142, and i is an index value.

With this example, quantum processor 122 can apply Hadamard operator 126 to second set 146 of quantum registers 124 after executing complementary quantum instruction 148. Quantum processor 122 can also measure second set 146 of quantum registers 124 to form second measurement 152 of second set 146 of quantum registers 124. Measurement of each quantum register in second set 146 of quantum registers 124 results in a bit. The results of the measurement of second set 146 of quantum registers 124 is second measurement vector 156.

In this example, measurement 134 is first measurement 154 of first set 144 of quantum registers 124. Further, measurement vector 138 forms second measurement vector 156 when two sets of quantum registers are used in determining approximate count 110.

In determining approximate count 110 of events 102, quantum processor 122 can determine approximate count 110 of events 102 using first measurement 154 of first set 144 of quantum registers 124 and second measurement 152 of second set 146 of quantum registers 124. In this example, approximate count 110 of events 102 using first measurement 154 of first set 144 of quantum registers 124 and second measurement 152 of second set 146 of quantum registers 124 can be determined by quantum processor 122 as follows:

$$C(E) \approx G^{-1}\left(\frac{C(r_1) - C(r_2)}{M}\right)$$

where $G^{-1}$ is the inverse of:

$$G(c) = \left(\left(\sum_{i=c+1}^{L(E)} 2^i\right)/2^n\right)^2 - \left(\left(\sum_{i=n-c}^{L(E)} 2^i\right)/2^n\right)^2$$

and has inverse $G^{-1}$ that produces approximate count 110 of events 102 given the probabilities as in C(E)=$G^{-1}$(p(E)−$p^c$(E)), where n is a number of qubits used in quantum registers 124, c(r1) is a first count of logic 1s in first measurement vector 158 in first measurement 154, c(r2) is a second count of logic 1s in second measurement vector 156 in second measurement 152, M is a number of quantum registers 124, L(E) is length 118 of event vector 114, c is the event count, and i is an index value. The event count is the number of events an event vector 114 and is determined by the number of is in event vector 114

In this illustrative example, the bits in first measurement vector 138 and second measurement vector 156 can be used to obtain approximate count 110 in lookup table 136. The bits in first measurement vector 138 and second measurement vector 156 can be used to identify approximate count 110 in lookup table 136 that corresponds to the bits in these two measurement vectors.

The illustration of event counting environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, quantum registers 124 can be considered to be part of quantum processor 122 in some illustrative examples. As another example, event vectors 112 can be received serially or in parallel. When event vectors 112 are received in parallel, multiple approximate counts are output for event vectors 112 received in parallel.

Figure 2:
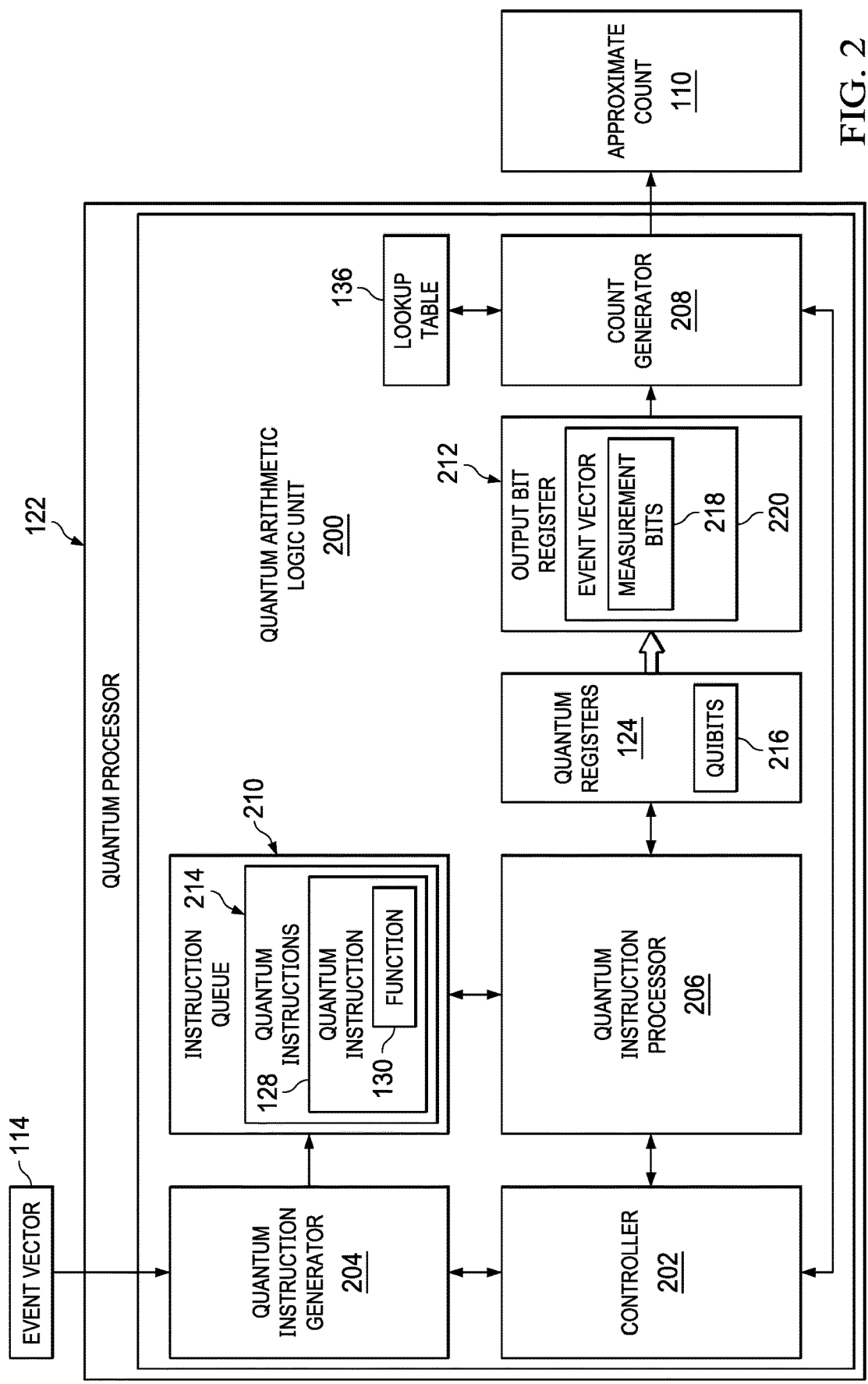
FIG. 2 is an illustration of a quantum processor in accordance with an illustrative embodiment.

With reference next to FIG. 2, an illustration of a quantum processor is depicted in accordance with an illustrative embodiment. In the illustrative examples, the same reference numeral may be used in more than one figure. This reuse of a reference numeral in different figures represents the same element in the different figures.

In this illustrative example, a quantum processor can comprise quantum arithmetic logic unit (QALU) 200. As depicted in this example, quantum arithmetic logic units 200 includes controller 202, quantum instruction generator 204, quantum instruction processor 206, count generator 208, instruction queue 210, quantum registers 124, and output bit register 212. Although shown as a separate functional component in FIG. 1, quantum registers 124 are part of quantum processor 122 implemented as part of quantum arithmetic logic unit 200 in this particular example.

As depicted, quantum arithmetic logic unit 200 receives event vector 114 as an input and outputs approximate count 110. In this illustrative example, controller 202 controls the operation of functional components such as quantum instruction generator 204, quantum instruction processor 206, and count generator 208.

As shown in this figure, quantum instruction generator 204 receives event vector 114 for processing to determine approximate count 110. Event vector 114 is processed by quantum instruction generator 204 to generate quantum instruction 128 that incorporates function 130 in a manner that function 130 can be applied by quantum instruction processor 206 to the content of set 127 in FIG. 1 of quantum registers 124. As depicted, quantum instruction generator 204 can also generate function 130 based on events 102 identified by bits 116 in FIG. 1 in event vector 114. In other words, the logic 0s and logic 1s in bits 116 as well as the order of these logic 0s and logic 1s can determine function 130.

In this illustrative example, quantum instruction 128 is placed into quantum instructions 214 in instruction queue 210. Instruction queue 210 holds quantum instructions 214 which can include other quantum instructions incorporating functions based on bits in the event vectors in addition to quantum instruction 128. Additionally, quantum instructions 214 can also include other instructions that do not incorporate function 130. These other types of quantum instructions can include, for example, quantum instructions 214 for Hadamard operator 126 in FIG. 1, measurement 134 in FIG. 1, and other types quantum instructions that can cause operations to be performed on qubits 216 in quantum registers 124.

As depicted, controller 202 controls the execution of quantum instructions 214 in instruction queue 210. For example, controller 202 directing execution of quantum instructions 214 in instruction queue 210 can reset quantum registers 124 and apply Hadamard operator 126 to quantum registers 124.

Further, the execution of quantum instructions 214 can then apply function 130 in quantum instruction 128 on quantum registers 124. In this illustrative example, quantum instruction 128 is dictated to apply function 130 to each quantum register in quantum registers 124. In other words, the same quantum instruction is executed on each of quantum registers 124 in the illustrative example "M" times, with M being the number of quantum registers 124 that are used.

The execution of quantum instructions 214 can apply Hadamard operator 126 to quantum registers 124 after executing quantum instruction 128 and measure quantum registers 124 to form measurement bits 218 in event vector 220 stored in output bit register 212. These bits in output bit register 212 form measurement vector 138 when one set of quantum registers 124 is used.

As depicted, each measurement bit in measurement bits 218 in event vector 220 is a result of a measurement of a quantum register in quantum registers 124. In this illustrative example, count generator 208 can generate approximate count 110 using measurement bits 218 in event vector 220. The number of measurement bits 218 corresponds to the number of quantum registers 124 in this depicted example.

Figure 3:
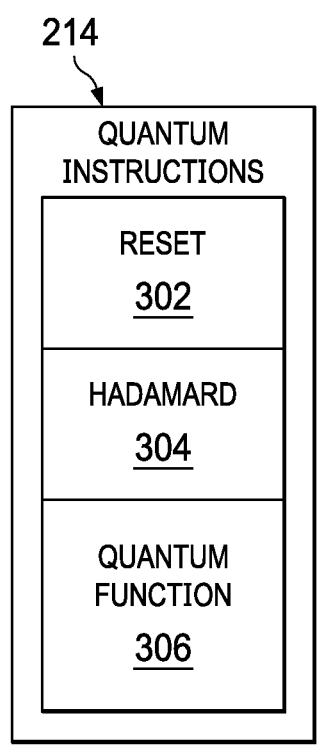
FIG. 3 is an illustration of quantum instructions in accordance with an illustrative embodiment.

With reference next to FIG. 3, an illustration of quantum instructions is depicted in accordance with an illustrative embodiment. Examples of quantum instructions 214 that can be located in instruction queue 210 in FIG. 2 are depicted.

As depicted, quantum instructions 214 can include a number of different types of instructions. In this illustrative example, quantum instructions 214 include reset 302, Hadamard 304, and quantum function 306.

In this particular example, reset 302 is a quantum instruction that can be executed to reset quantum registers 124 in FIGS. 1-2. In this example, a reset of quantum registers 124 is performed prior to processing a new event vector in the set of quantum registers 124. With a reset of the set of quantum registers 124, the values of 0 can be put into the set of quantum registers 124. The value of 0 is placed into a number of qubits 216 in FIG. 2 equal to the number of bits and event vector 114. Additionally, a 1 can also be placed into an additional qubit. This additional qubit is a qubit in qubits 216 in addition to the number of bits in event vector 114. The use of the additional qubit set to a 1 enables reversing a superposition in the set of quantum registers 124. The ability to reverse the supervision enables measuring the contents of the set of quantum registers 124 in this example.

Hadamard 304 is a quantum instruction that applies a Hadamard operator to create superposition in qubits 216 in the set of quantum registers 124. Hadamard 304 can be executed again to enable the desired result from measuring qubits 216 in the set of quantum registers 124. A second execution of Hadamard 304 can be performed after the set of quantum registers 124 has been manipulated through other instructions.

Quantum function 306 is an example of quantum instruction 128 in FIGS. 1-2 that incorporates function 130 in FIGS. 1-2 and can be executed to apply function 130 on the set of quantum registers 124. In other words, quantum function 306 is a quantum instruction that incorporates function 130 for execution by quantum instruction processor 206 in quantum processor 122 as shown in block form in FIG. 2. As depicted, function 130 is a function for event vector 114 that comprises events 102 identified by bits 116.

Figure 4:
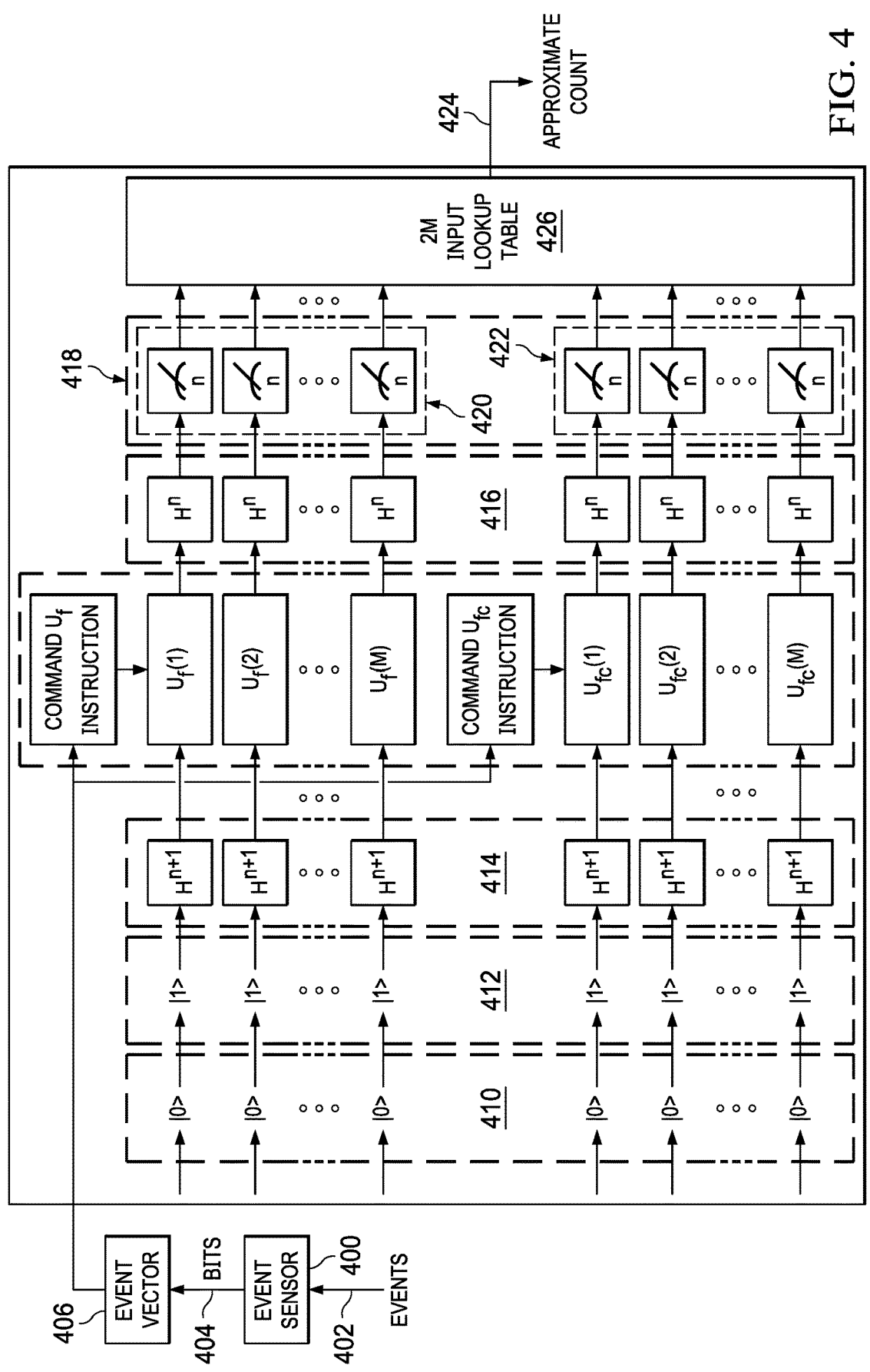
FIG. 4 is an illustration of data flow for determining an approximate count of events using quantum instructions and complementary quantum instructions in accordance with an illustrative embodiment.

Turning to FIG. 4, an illustration of data flow for determining an approximate count of events using quantum instructions and complementary quantum instructions is depicted in accordance with an illustrative embodiment. In this depicted example, an example of data flow occurring during operations performed by quantum arithmetic logic unit 200 in counting system 106 in FIG. 1 are depicted.

In this illustrative example, event sensor 400 detects events 402 to generate bits 404, which as placed into event vector 406. Event sensor 400 is an example of an event detector in event detectors 104 in FIG. 1.

As depicted, quantum arithmetic logic unit 200 receives event vector 406 and generates M number of quantum instructions 410 and M number of complementary quantum instructions 412 using event vector 406. In this example 2M quantum registers are present. Additionally, in this illustrative example, all of quantum instructions 410 are the same and all of complementary quantum instructions 412.

As shown in this example, quantum arithmetic logic unit 200 resets the 2M quantum registers using column vectors $|0\rangle$ 410 for n bits in each quantum register and a column vector $|1\rangle$ 412 for the n+1 bit in each quantum register. In this example, n is the number of bits in event vector 406. Next, quantum arithmetic logic unit 200 applies Hadamard operators ($H^{n+1}$) 414 to n+1 bits in the 2M quantum registers.

Quantum arithmetic logic unit 200 applies quantum instructions 410 and complementary quantum instructions 412 to the 2M quantum registers. In this example, quantum instructions 410 are applied to M quantum registers in which a quantum instruction in quantum instructions 410 is applied to each of the M quantum registers. As a result, the same quantum instruction is applied to each of the M quantum registers.

Further, complementary quantum instructions 412 are applied to M quantum registers, which are different quantum registers from the M quantum registers to which quantum instructions 410 are applied. In this example, a complementary quantum instruction in complementary quantum instructions 412 is applied to each of the M quantum registers. As a result, the same complementary quantum instruction is applied to each of the M quantum registers.

After applying the M number of quantum instructions 410 and the M number of complementary quantum instructions 412 to the quantum registers, quantum arithmetic logic unit 200 applies Hadamard operators ($H^{n+1}$) 416 to n bits in the 2M quantum registers.

Next, quantum arithmetic logic unit 200 measures the 2M quantum registers to obtain output bits 418. In this example, output bits 418 are grouped into 2 measurement vectors, measurement vector 420 and measurement vector 422. Each bit in output bits 418 in measurement vector 420 are from a quantum register on which a quantum instruction was applied, and each bit in output bits 418 in measurement vector 422 are from a quantum register on which a complementary quantum instruction was applied.

Measurement vector 420 and measurement vector 422 can be used to determine approximate count 424 of events 402. As depicted, measurement vector 420 and measurement vector 422 are used as inputs into lookup table 426 to obtain approximate count 424 that corresponds to measurement vector 420 and measurement vector 422 in lookup table 426.

Figure 5:
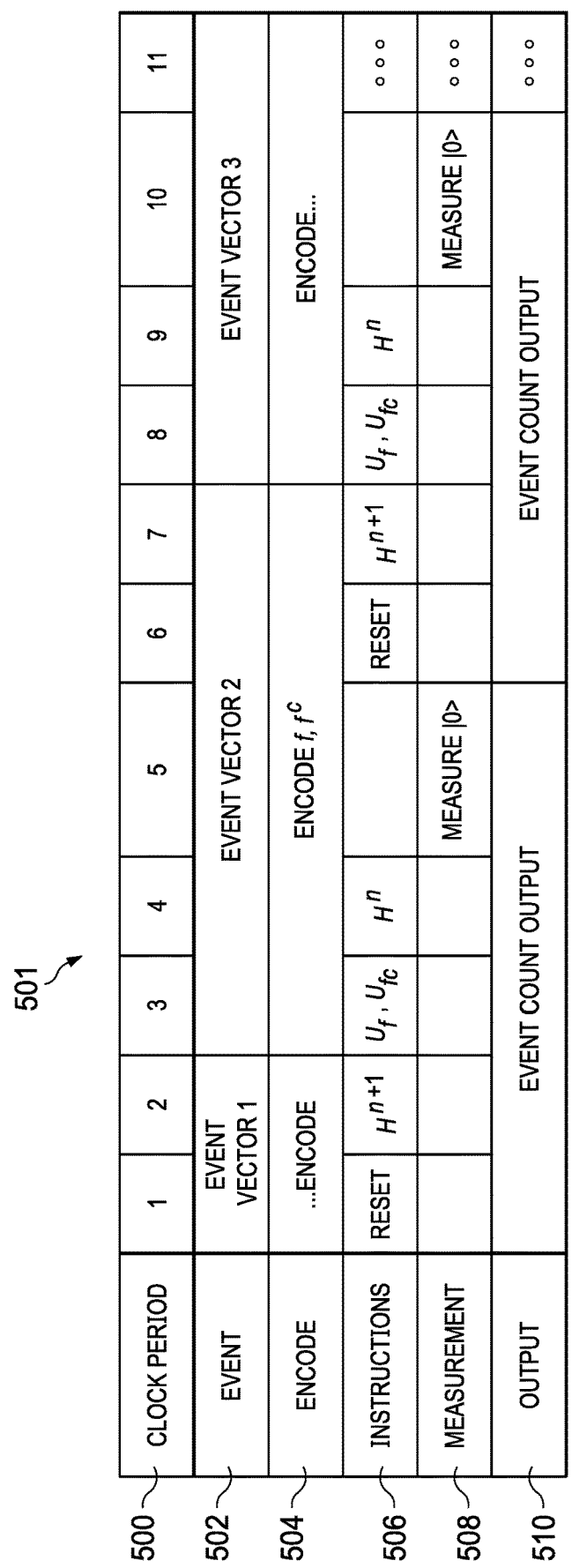
FIG. 5 is an illustration of a timing diagram for counting events in accordance with an illustrative embodiment.

With reference next to FIG. 5, an illustration of a timing diagram for counting events is depicted in accordance with an illustrative embodiment. In this illustrative example, clock period 500 in timing diagram 501 identifies clock periods during which processing of events occurs to obtain an approximate count. In this example, an event can be processed every five clock cycles by quantum processor 122 in FIGS. 1-2.

Event vector 502 in timing diagram 501 identify event vectors that are processed during different clock cycles. Encode 504 identifies the clock cycles when encoding occurs to generate quantum instructions that incorporate functions based on the event vectors. For example, function 130 in FIGS. 1-2 can perform a logic AND of a first set of bits in a quantum register that corresponds to a second set of bits in the event vector that indicate a presence of an event. The function can be as follows:

$$f(x) = (\wedge_{i=1}^{n} x_i^{E_i})$$

wherein $E_i$ is an ith bit in the event vector, n is a number of bits in the event vector, $X_i$ is the ith bit in the quantum register, and i is an index value.

The quantum instruction encoded during each encode in encode 504 using the function can be as follows:

$$U_f = \sum_{x \in 0,1^{L(E)}} \sum_{y \in 0,1^1} (|x\rangle\langle x|) \otimes (|y \oplus f(x)\rangle\langle y|)$$

where L(E) is the vector length, x is an index value, y is an index value, and f(x) is the function. This quantum instruction can be executed to operate on a quantum register of length L(E)+2=n+1.

The complementary function can be as follows:

$$f_c(x) = \left( \bigwedge_{i=1}^{n} x_i^{not(E_i)} \right)$$

where $E_i$ is an ith bit in the event vector, n is a number of bits in the event vector, $X_i$ is the ith bit in the quantum register, and i is an index value. In this case, $U_{f_c}$ can be encoded from the function $f_c(x)$ at the same time as $U_f$ from function f(x).

Instructions 506 in timing diagram 501 identify instructions that are executed at the different clock periods in clock period 500. As depicted, instructions 506 show a sequence of instructions that are performed during the different clock periods in clock period 500. In this illustrative example, the sequence of instructions can be Reset, $H^{n+1}$, $U_f$, $U_f^c$, and $H^n$. In this example, instructions $U_f$ and $U_{f_c}$ can be executed parallel. This parallel execution can occur such that an additional clock period is unnecessary.

Reset in instructions 506 is an example of reset 302 in FIG. 3. $H^{n+1}$ is an example of Hadamard 304 in FIG. 3 performed on n+1 qubits in the set of quantum registers 124 in which n is the number of bits in event vector 114 in FIGS. 1-2. In this example, a quantum register has more than n qubits. In this example, each quantum register has least n+1 qubits. The measurements are made from the first n bits.

As depicted, $U_f$ in instructions 506 is an example of quantum function 306 in FIG. 3. In this illustrative example, $U_f$ and $U_f c$ are executed in the clock period after the function f(x) is encoded into the quantum instruction, $U_f$, and fc(x) is encoded into the quantum instruction, $U_f c$. $H^n$ in instructions 506 is another example of Hadamard 304 that is performed on a quantum register in the set of quantum registers 124. In this example, $H^n$ is performed on qubits in a quantum register.

In this illustrative example, measurement 508 identifies when measurements are of the set of quantum registers. Output 510 indicates the time during which event output is generated to output an approximate count of events in an event vector.

As can be seen in this depicted example, an event output operation in output 510 begins after a measurement, measure |0> occurs in measurement 508 to measure the contents of set 127 of quantum registers 124 to generate output bits for measurement vector 138. In this illustrative example, each bit is the result of a measurement of a quantum register. In other words, measurement of the qubits in a quantum register results in a single bit in the output bits that form measurement vector 138. These output bits in measurement vector 138 can be used to determine approximate count 100.

As depicted in this example, a reset is executed on the set of quantum registers during clock period 1, and a $H^{n-1}$ is executed during clock period 2. During these two clock periods, the processing event vector 1 and the encoding of function f(x) is completed. Next, in clock period 3, $U_f$ is executed. In clock period 4, $H^n$ is executed. Measurement of the set of quantum registers 124 is performed in clock period 5. The process then repeats as can be seen in timing diagram 501. Thus, an approximate count can be determined from an event vector in five clock periods in this illustrative example.

In one illustrative example, one or more technical solutions are present that overcome a technical problem with counting events when the frequency or speed at which events occur increases. In the illustrative examples, one or more technical solutions take into account that current event counting systems have difficulty can events occurring at frequencies over 100 GHz. As a result, one or more technical solutions can provide a technical effect of counting events using a quantum processing system. In the illustrative examples, a computer system including a quantum processor can provide approximate counts for events occurring at much higher rates as compared to current event counting systems.

Computer system 120 in FIG. 1 can be configured to perform at least one of the steps, operations, or actions described in the different illustrative examples using software, hardware, firmware, or a combination thereof. As a result, computer system 120 operates as a special purpose computer system in which quantum components such as quantum processor 122 in computer system 120 enables counting events 102. In particular, quantum processor 122 transforms computer system 120 into a special purpose computer system as compared to currently available general computer systems that do not have quantum processor 122.

In the illustrative example, the use of quantum processor 122 in computer system 120 integrates processes into a practical application for a method for counting events that increases the performance of computer system 120 in which computer system 120 is able to count events at much higher frequencies as compared to current computers or devices that count events. In other words, quantum processor 122 in computer system 120 is directed to a practical application of processes integrated into quantum processor 122 in computer system 120 that execute quantum instructions in quantum registers using a process that provides an approximate count of events. In this manner, quantum processor 122 in computer system 120 provides a practical application of operations to count events in a manner that increases the speed at which the events can be counted as an approximate count of the events such that the functioning of computer system 120 is has an improved ability to count events at increasing frequencies as compared to current events counting systems.

Figure 6:
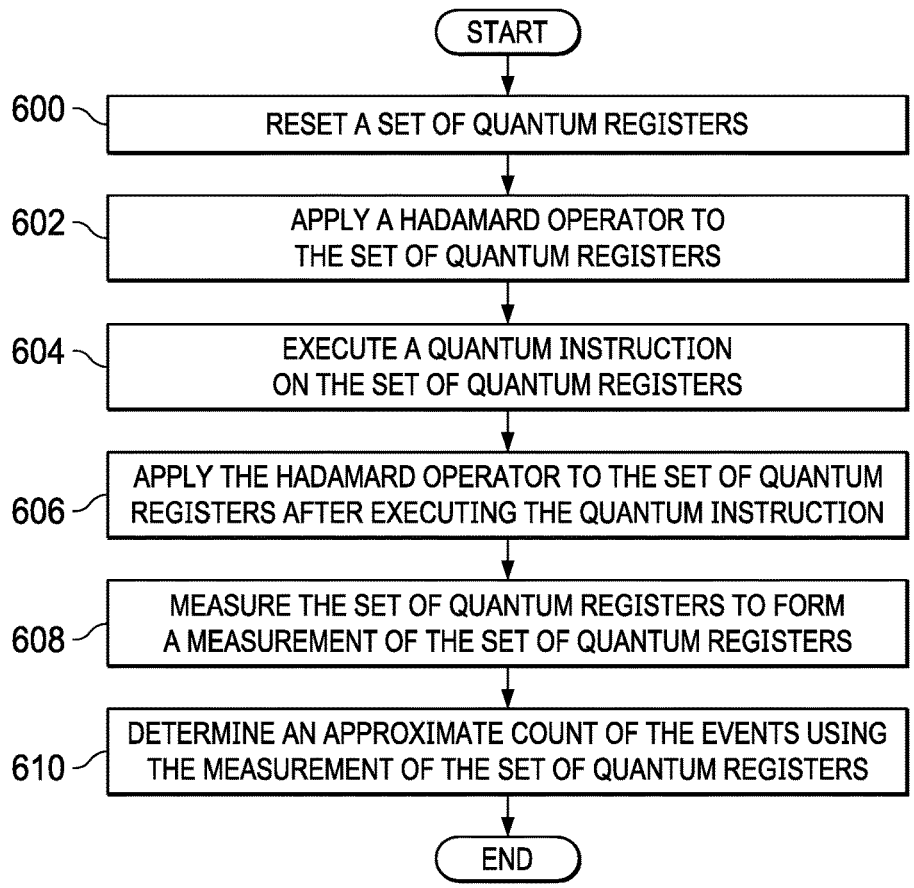
FIG. 6 is an illustration of a flowchart of a process for counting events in accordance with an illustrative embodiment.

Turning next to FIG. 6, an illustration of a flowchart of a process for counting events is depicted in accordance with an illustrative embodiment. The process in FIG. 6 can be implemented in hardware, software, or both. When implemented in software, the process can take the form of program code that is run by one or more processor units located in one or more hardware devices in one or more computer systems. For example, the process can be implemented in component quantum processor 122 in computer system 120 in FIG. 1.

The process begins by resetting a set of quantum registers (operation 600). The process applies a Hadamard operator to the set of quantum registers (operation 602).

The process executes a quantum instruction on the set of quantum registers (operation 604). In operation 604, the quantum instruction incorporates a function for an event vector comprising events identified by bits.

The process applies the Hadamard operator to the set of quantum registers after executing the quantum instruction (operation 606). The process measures the set of quantum registers to form a measurement of the set of quantum registers (operation 608).

The process determines an approximate count of events using the measurement of the set of quantum registers (operation 610). The process terminates thereafter. In operation 610, approximate count of the events can be determined as follows:

$$C(E) = F^{-1} C(r)/M$$

where $C(r)$ is a count of logic ones in a measurement vector in the measurement, and M is a number of quantum registers. $F^{-1}$ is the inverse of $F(c)$ which is as follows:

$$F(c) = \left( \left( \sum_{i=c+1}^{L(E)} 2^i \right) / 2^n \right)^2$$

where $L(E)$ is the length of the event vector, i is an index value, n is the number of qbits, c is the event count.

Figure 7:
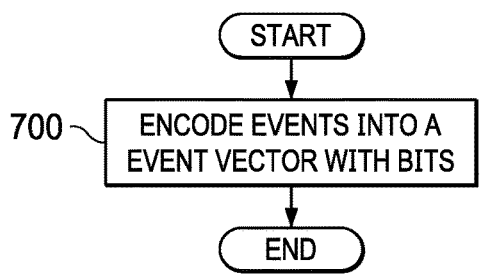
FIG. 7 is an illustration of a flowchart of a process for encoding events in accordance with an illustrative embodiment.

Turning next to FIG. 7, an illustration of a flowchart of a process for encoding events is depicted in accordance with an illustrative embodiment. The operation illustrated in FIG. 7 is an example of an additional operation that can be performed in the flowchart in FIG. 6 to count events.

The process begins by encoding events into an event vector with bits (operation 700). The process terminates thereafter. In operation 700, the process creates an event vector in which each bit indicates whether an event is present. For example, a logic 1 in the event vector indicates that an event was detected while a logic 0 indicates that an event was not detected. In other words, the bits can be generated periodically and indicate whether an event was detected at that particular period of time.

Figure 8:
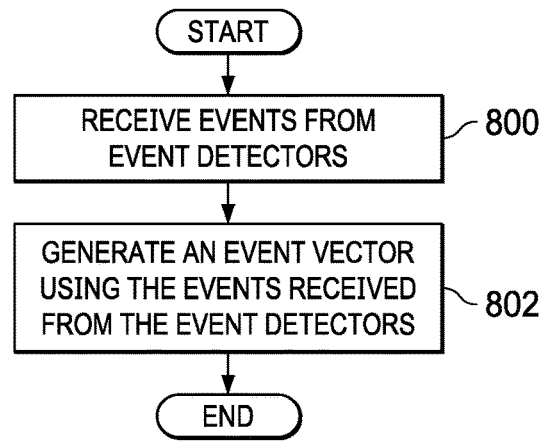
FIG. 8 is an illustration of a flowchart of a process for receiving events in accordance with an illustrative embodiment.

With reference next to FIG. 8, an illustration of a flowchart of a process for receiving events is depicted in accordance with an illustrative embodiment. The operation illustrated in FIG. 8 is an example of an additional operation that can be performed in the flowchart in FIG. 6 to count events.

The process receives events from event detectors (operation 800). In this illustrative example, these event detectors can be a hardware system such as sensor systems. A sensor system can contain one or more sensors and can generate signals in response to detecting events. In other words, the sensors transform the detection of events in an environment into at least one of electrical or optical signals that represent the detection of events in the environment.

The process generates an event vector using the events received from the event detectors (802). The process terminates thereafter. The signals received from the event detectors can be interpreted as a logic 1 or logic 0. In other illustrative examples, the event vector can be a vector of binary digits in which a logic 0 indicates the absence of an event and a logic 1 indicates the presence of an event. In another illustrative example, a logic 1 can indicate an absence of the event with a logic 0 indicating the presence of an event.

Figure 9:
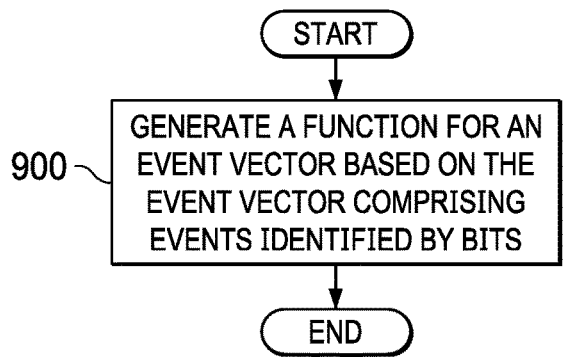
FIG. 9 is an illustration of a flowchart of a process for generating a function in accordance with an illustrative embodiment.

With reference next to FIG. 9, an illustration of a flowchart of a process for generating a function is depicted in accordance with an illustrative embodiment. The operation illustrative in FIG. 9 is an example of an additional operation that can be performed in the flowchart in FIG. 6 to count events.

The process generates a function for an event vector based on the event vector comprising events identified by bits (operation 900). The process terminates thereafter.

Figure 10:
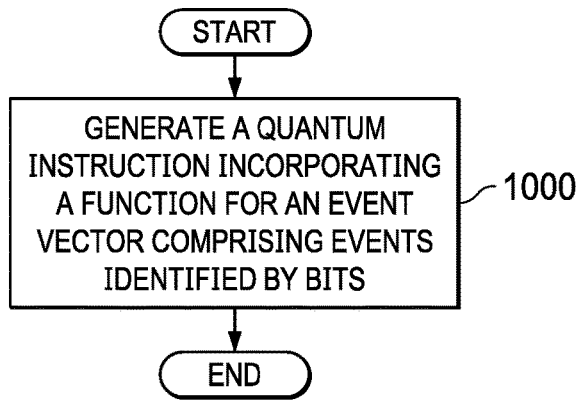
FIG. 10 is an illustration of a flowchart of a process for generating a quantum instruction in accordance with an illustrative embodiment.

With reference next to FIG. 10, an illustration of a flowchart of a process for generating a quantum instruction is depicted in accordance with an illustrative embodiment.

The operation illustrated in FIG. 10 is an example of an additional operation that can be performed in the flowchart in FIG. 6 to count events.

The process generates a quantum instruction incorporating a function for an event vector comprising events identified by bits (operation 1000). The process terminates thereafter.

Figure 11:
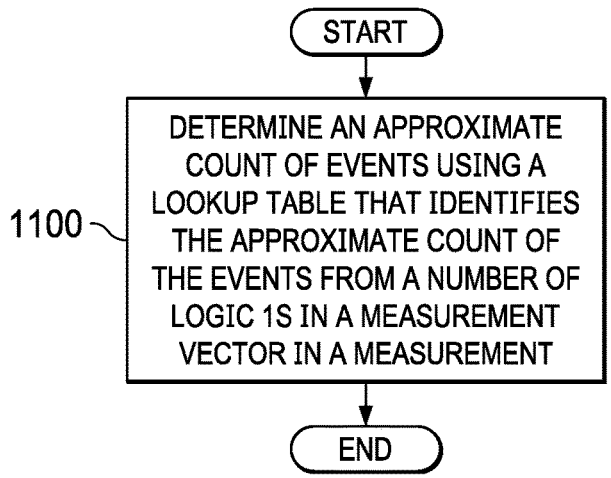
FIG. 11 is an illustration of a flowchart of a process for determining an approximate count in accordance with an illustrative embodiment.

Turning to FIG. 11, an illustration of a flowchart of a process for determining an approximate count is depicted in accordance with an illustrative embodiment. The operation illustrative in FIG. 11 is an example of one implementation for operation 610 in FIG. 6. In this example, the measurement of the set of quantum registers is a measurement vector that is 'M' bits long. In this example, M is how many quantum registers are present in the set of quantum registers.

The process determines an approximate count of events using a lookup table that identifies the approximate count of the events from a number of logic 1s in a measurement vector in a measurement (operation 1100). The process terminates thereafter.

Figure 12:
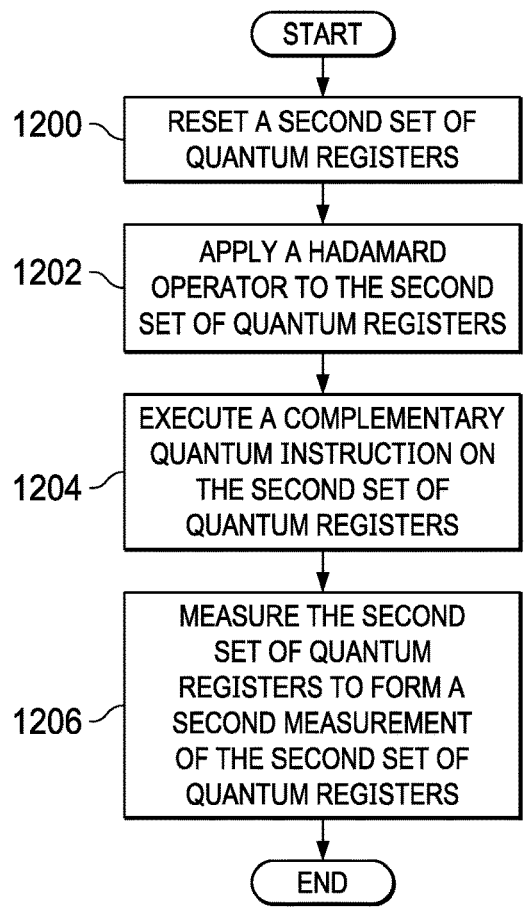
FIG. 12 is an illustration of a flowchart of a process for determining an approximate count of events using two sets of quantum registers in accordance with an illustrative embodiment.

In FIG. 12, an illustration of a flowchart of a process for determining an approximate count of events using two sets of quantum registers is depicted in accordance with an illustrative embodiment. The operations illustrated in FIG. 12 are examples of additional operations that can be performed in the process in FIG. 6 in determining an approximate count using two sets of quantum registers. In the illustrative example, the operations performed on the second set of quantum registers in this flowchart can be performed at the same time as corresponding operations to the first set of quantum registers.

In this example, the set of quantum registers is a first set of quantum registers. Further, the measurement of the set of quantum registers is a first measurement of the first set of quantum registers.

The process resets a second set of quantum registers (operation 1200). The process applies a Hadamard operator to the second set of quantum registers (operation 1202).

The process executes a complementary quantum instruction on the second set of quantum registers (operation 1204). The complementary quantum instruction incorporates a complementary function that is complementary to the function for the event vector comprising the events identified by the bits. The process applies the Hadamard operator to the second set of quantum registers after executing the complementary quantum instruction.

The process measures the second set of quantum registers to form a second measurement of the second set of quantum registers (operation 1206). The process terminates thereafter.

Figure 13:
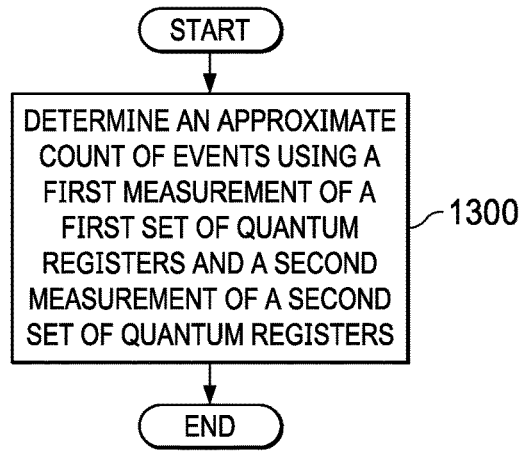
FIG. 13 is an illustration of determining an approximate count of events in accordance with an illustrative embodiment.

Turning to FIG. 13, an illustration of determining an approximate count of events is depicted in accordance with an illustrative embodiment. The process illustrated in FIG. 13 is an example of an implementation for operation 610 in FIG. 6 when two sets of quantum registers are measured as described in FIG. 11.

The process determines an approximate count of events using a first measurement of a first set of quantum registers and a second measurement of a second set of quantum registers (operation 1300). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

In the Deutsch-Jozsa problem, two classes of functions are present. These classes are constant functions and balanced functions. In this example, f(x) is a function from n bits to 1 bit. For a balanced function, f(x) is constant if its output is the same for all inputs, and f(x) is a balanced function if the function is zero on half of the possible inputs and one on the other half of the possible inputs.

In this example, f(x) itself is not a reversible function. The illustrative example can be to create a reversible function that can be implemented in a quantum processor. The illustrative examples recognize and take into account that it is often a problem that internal bits are necessary to implement functions in a quantum computer and these "garbage" bits must be present as part of the quantum register. However, these "garbage" bits can be an issue if the "garbage" bits are present in the rest of the computation.

The illustrative examples recognize and take into account that one manner to handle this issue can be to start with the function f(x) from n bits to m bits. The illustrative examples recognize and take into account that a reversible operation can be created using n+m input bits which act as $(x,y) \rightarrow (x, y \ominus f(x))$ where $\ominus$ is a bitwise XOR. This is reversible but does introduce m garbage bits. Since f(x) is made up of reversible circuits, $f(x)^{-1}$ can be implemented by reversing the order of the circuit elements and then implementing the inverse of each of these elements.

Making any function reversible allows that function to be turned into reversible quantum gates for implementation in a quantum processor. For example, if h: 0, $1^n \rightarrow 0$, $1^n$ is a reversible function, then:

$$\sum_{x \in \{0,1\}^n} |h(x)\rangle\langle x|$$

where h(x) is a reversible function, x is an n qbit input, and n is the number of qbits on which the reversible function operates.

This expression can be implemented using unitary gates on n qubits and, on the computational basis, it will compute the reversible function h.

Using the approach above, the reversible quantum instruction can be generated by constructing both parts of the function $(x, y \ominus f(x))$ in the two parenthetical terms:

$$U_f = \sum_{x \in 0,1^n} \sum_{y \in 0,1^n} (|x\rangle\langle x|) \otimes (|y \oplus f(x)\rangle\langle y|)$$

where n is, x is an n qbit input, and y is a single qbit input. Together, x and y comprise n+1 qbits.

In this example, if the function is queried using computational basis states such as $|x, y\rangle$, the value $|x, y \ominus f(x)\rangle$ can be obtained. If y=0, $f(x)$ has been computed. Also, if y=1, $\vec{f}(x)$ has been computed in which $\vec{f}(x)$. is the complement of f(x)

The Deutsch-Jozsa algorithm can use phase kickback to transfer the phase of qubit amplitudes into the probabilities of the states. In this example, a single qubit example is depicted. Let $y=|-\rangle = 1/\sqrt{2}(|0\rangle - |1\rangle)$. Then $$U_f|x\rangle \otimes |-\rangle \otimes 1/\sqrt{2}(|f(x)\rangle - \vec{f}(x)\rangle)$$

If $f(x)=0$, then the value is $|x\rangle \otimes 1/\sqrt{2}(|0\rangle - |1\rangle)$ and if $f(x)=1$, the value is $-|x\rangle \otimes 1/\sqrt{2}(|0\rangle - |1\rangle)$. Thus, $$U_f|x\rangle \otimes |-\rangle = (-1)^{f(x)}|x\rangle \otimes |-\rangle$$

As a result, the internal qubit phase is kicked back into the final phase of the output in the $(-1)^{f(x)}$ term.

This concept can be applied an n qubit register. The input $$|\psi\rangle = 1/\sqrt{2}\Sigma_{x \in 0,1^n}|x\rangle \otimes |-\rangle$$

This gives $$U_f|\psi\rangle = 1/\sqrt{2^n}\Sigma_{x \in 0,1^n}(-1)^{f(x)}|x\rangle$$

If the Hadamard operation is performed n times to $U_f|\psi\rangle$, the following is obtained:

$$H^n = \Sigma_{x,y \in 0,1^n}(-1)^{x \cdot y}|y\rangle\langle x| = 1/\sqrt{2^n}\Sigma_{x,y \in 0,1^n}(-1)^{x \cdot y}|y\rangle\langle x|$$

wherein x is an n qbit input, y is a single qbit input, n is n is the number of qbits on which the reversible function operates.

Here:

$$x \cdot y = x_1 y_1 + x_2 y_2 + \ldots + x_n y_n$$

In this example, $H^{\otimes n}$ will produce a superposition over all possible states if applied to the zero state (here the zero state $|0\rangle$ is now n qubits):

$$H^{\otimes n}|0\rangle = 1/\sqrt{2^n}\Sigma_{x \in 0,1^n}|x\rangle$$

And since $H^2 = I$, we see that $$H^{\otimes n}(1/\sqrt{2^n}\Sigma_{x \in 0,1^n}|x\rangle) = |0\rangle$$

If function f(x) is constant and the Hadamard operation are applied to the state produced after the phase kickback, then the new state is:

$$H^{\otimes n}(1/\sqrt{2^n}\Sigma_{x \in 0,1^n}(-1)^{f(0)}|x\rangle) = (-1)^{f(0)}|0\rangle$$

Thus, the output state will be $|0\rangle$. Conversely, if we apply to a balanced function f(x), then the calculation shows that $$H^{\otimes n}(1/\sqrt{2^n}\Sigma_{x \in 0,1^n}(-1)^{f(x)}|x\rangle) = 1/\sqrt{2^n}\Sigma_{x \in 0,1^n}(-1)^{x \cdot y + f(x)}|y\rangle$$

If a measurement is made along the $|0\rangle$ direction, the probability of getting $|0\rangle$ is $$|2^{-n}\Sigma_{x \in 0,1^n}(-1)^{f(x)}|^2 \tag{1}$$

Since f is balanced, this sum is 0. Thus, indication of constant or balanced is present if the result is $|0\rangle$ or not $|0\rangle$ respectively (these are n qubit values).

Figure 14:
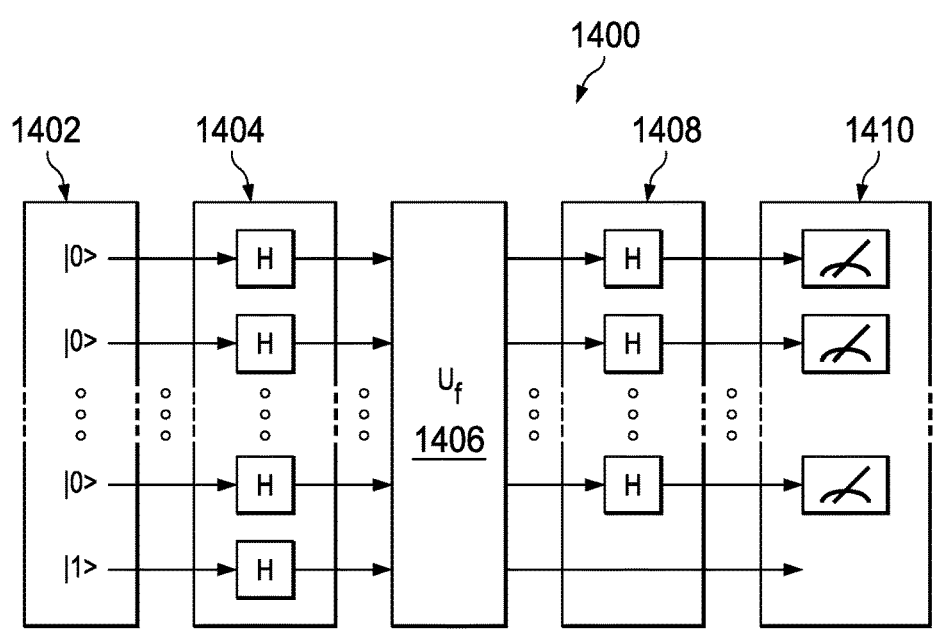
FIG. 14 is an illustration of a quantum circuit in accordance with an illustrative embodiment.

With reference next to FIG. 14, an illustration of operations performed for a Deutsch Josza process is depicted in accordance with an illustrative embodiment. As depicted, operations 1400 comprises performing reset operations 1402 and Hadamard operations 1404 on quantum registers. Next, $U_f$ operations 1406 are performed on the quantum registers. Hadamard operations 1408 are performed on the quantum registers after $U_f$ operations 1406. Measurement operations 1410 are performed to obtain an output bit from each quantum register. The output bits can be used to determine the approximate count of events.

Thus, the illustrative examples provide a process that can be implemented in a quantum arithmetic logic unit. The different operations illustrated in the flowcharts can be part of a quantum event counting algorithm (QEUCA) that includes use of a Deutsch-Jozsa Algorithm and Hadamard operations.

For example, E can an event vector of length n=L(E) consisting of 0's and 1's. A quantum event counting algorithm can take E as input and produce an approximate count of the number of 1's in the event vector C(E). The process in the illustrative example can be based on a Deutsch-Jozsa function. For example, the Deutsch-Jozsa function $f: \{0,1\}^n \to \{0,1\}$ for event counting can be defined as follows: Let n=L(E)+1 and define $f(x)=1$ where $x=[x_1, \ldots, x_{L(E)}, x_n]$ if and only if $x_i=1$ when $E_i=1$ for i=1, 2, \ldots, L(E) and $x_n=0$. Otherwise, $f(x)=0$. Thus, $f(x)$ is 1 precisely when the vector x agrees with E at every event and the last entry $x_n=0$. This can be written using Boolean logic as follows:

$$f(x) = (\Lambda_{i=1}^n x_i^{E_i}) \tag{2}$$

Here, $\Lambda$ denotes Boolean AND the factor $\Lambda_{i=1}^n x_i^{E_i}$ denotes the Boolean AND of all components of x where events are present (there is a 1 in the event vector). This Boolean AND operation can be constructed as part of a unitary instruction on a qubit register since it consists of quantum logic operations. The full instruction $U_f$ is defined using f and is the quantum instruction defined by $$U_f = \Sigma_{x \in 0,1^{L(E)}} \Sigma_{y \in 0,1^1}(|x\rangle\langle x|) \otimes (|y \oplus f(x)\rangle\langle y|) \tag{3}$$

where x is an n qbit value, y a single qbitindex value, f(x) is the function based on the event vector, and L(E) is a length of the event vector. In this example, $U_f$ operations can be performed on n+1 qbits [x,y]. This quantum instruction can be executed to operate on a qubit register of length L(E)+2=n+1, wherein L(E) is the length of the event vector and n is the number of measured qbits in a quantum register. Together with the Hadamard operations $H^{n+1}$ before and $H^n$ after $U_f$ this allows for the computation as in Deutsch-Jozsa above and gives a result which, when measured along the $|0\rangle$ direction (in other words, when all qubit states are measure as zero), gives the probability of getting $|0\rangle$ as $$p(E) = |2^{-n}\Sigma_{x \in 0,1^n}(-1)^{f(x)}|^2 \tag{4}$$

where f(x) is the function, n is the number of measured qbits in a quantum register, and x an n qbit value. In other words, the measured result is a bit which is 0 if the register is not in the $|0\rangle$ state and 1 if it is. The probability of getting a 1 can be calculated and depends only the event count C(E):

$$p(E) = ((\Sigma_{i=n-C(E)}^{L(E)} 2^i)/2^n)^2 \tag{5}$$

where C(E) is the number of logic 1s in an event vector, L(E) is the length of the event vector, n is the number of measured qbits in a quantum register, and i is an index value.

The equation can be rewritten in a functional form as follows:

$$F(c) = \left(\left(\sum_{i=c+1}^{L(E)} 2^i\right)/2^n\right)^2$$

where L(E) is the length of the event vector, i is an index value, n is the number of qbits in a quantum register, and c is the event count.

F(c) is defined as for a integer event count c where $0 \le c \le L(E)$: Then p(E)=F(C(E)): This function F(c) is monotonic in c and so it has an inverse function $F^{-1}$ which takes the probability p(E) and produces the corresponding count c=C(E); as with C(E)=$F^{-1}$(p(E)).

As a result, an event vector E can be processed to produce a measured qbit result that is probabilistically related to the event count C(E) of E. This processing can include using quantum operations on an n+1 quantum qubit register comprising qubits. In this example, c is the event count for an event vector and is the number of ones the event vector.

The same quantum operations can be performed on M different quantum registers. This can result in producing a measurement vector that is M bits long. In other words, the length of the measurement vector is the number of quantum registers. The number of 1's in the measurement vector can be c. This number of 1's can be used to approximate p(E)≈C(r)/M. This approach can be performed without counting c. From the approximation, the event count could be approximated by using the inverse function $F^{-1}$ and computing:

$$C(E) \approx F^{-1}(C(r)/M$$

where C(r) is a count of logic ones in a measurement vector and M is the number of quantum registers.

Instead, the M measured non-quantum output bits in the measurement vector can be used with a lookup table (LUT) to identify an approximate count C(E) based on the inverse function that computes C(E) from p(E) using conventional electronic circuits. This inverse function can invert the relationship between C(E) and p(E) given in equation 6 so that looking up an input with a p(E) value would give the corresponding C(E) value. For example, the total number of 1's in the measurement vector can be used to identify approximate count C(E) in the lookup table.

While the approach can produce an approximate event count, the accuracy can be improved to reach desired levels using a second Deutsch-Jozsa function. We can define a complementary Deutsch-Jozsa function $f:^c \{0, 1\}^n \to \{0, 1\}$ so that $f^c(x)=1$ where $x=[x_1, \ldots, x_{L(E)}, x_n]$ if and only if $x_i=1$ when $E_i=0$ for $i=1, 2, \ldots, L(E)$ and $x_n=0$. This encoding of a complementary function $f_c(x)$ is as follows:

$$f_c(x) = (\wedge_{i=1}^n x_i^{non(E_i)}) \tag{6}$$

where $E_i$ is an ith bit in the event vector, n is a number of bits in the event vector, $X_i$ is the ith bit in the quantum register, and i is an index value.

In this example, $f_c(x)$ is 1 precisely when the bits of the vector x agree with E at every non-event. It then follows that the quantum instructions $U_{f^c}$ and the Hadamard operations can be used such that the measurement provides the following:

$$p^c(E) = |2^{-n} \Sigma_{x \in 0,1^n} (-1)^{f(x)}|^2 = ((\Sigma_{i=n-C(E)}^{L(E)} 2^i)/2^n)^2$$

Combining these approaches using another set of M registers can provide two measurement vectors that are M bit vectors $r_1$ and $r_2$ as measured outputs. In this example $c(r_1)$ and $c(r_2)$ are the counts of 1's in the measurement vectors. The two counts of 1's can be used to approximate $p(E)-p^c(E) \approx c(r_1)/M - c(r_2)/M$. Therefore, the approximate event count can be expressed as:

$$C(E) \approx G^{-1}\left(\frac{C(r_1) - C(r_2)}{M}\right) \tag{7}$$

where $G^{-1}$ is the inverse of:

$$G(c) = \left(\left(\sum_{i=c+1}^{L(E)} 2^i\right)/2^n\right)^2 - \left(\left(\sum_{i=n-c}^{L(E)} 2^i\right)/2^n\right)^2$$

and in which $G^{-1}$ produces an approximate count of the events given the probabilities as in $C(E)=G^{-1}(p(E)-p^c(E))$, where n is a number of qubits used in set of quantum registers, c(r1) is a first count of logic 1s in a first measurement vector in a first measurement, c(r2) is a second count of logic 1s in a second measurement vector in a second measurement 152, M is a number of quantum registers, L(E) is a length 118 the event vector, c is an event count, and i is an index value.

In this example, a lookup table that takes 2M bits [$r_1; r_2$] as input and produces a stored value of $G^{-1}((C(r1)-C(r2))/M$ can produce the final approximate event count. In the illustrative example, using both F(x) and $F_c(x)$ results in a more accurate approximate count of events as compared to using f alone. In other words, the inputs are used to find the approximate count to those input bits in the lookup table.

In the illustrative example, the events are sensed by a sensor that creates high and low voltage signals. These signals are then processed to create a binary vector E of length L(E) where a value of 1 denotes an event and a value of 0 denotes a non-event. In one illustrative example, 2M qubit quantum registers are used. Additionally, each quantum register can have at least L(E)+2=n+1 bits that are programmable as part of a quantum arithmetic logic unit such as quantum arithmetic logic unit 200 in FIG. 2. The process performed by the quantum events counting algorithm (QECA) in one illustrative example can be summarized as follows:

1. Reset each quantum register.
2. Apply the Hadamard operation $H^{n+1}$ on each quantum register.
3. Encode each event vector into encoded operations f and $f^c$ as listed in equations 2 and 6.
4. Generate quantum instructions that contain the quantum functions $U_f$ and $U_{f^c}$ using the encoding operations f and $f^c$ as listed in equation 3.
5. Execute the quantum instruction to apply $U_f$ to the first M qubit registers and $U_{f^c}$ to the second M qubit registers.
6. Apply the Hadamard operation $H^n$ on each quantum register.
7. Test for the zero-quantum state for all 2M quantum registers and produce a bit for each quantum register that is 0 if the state is non-zero or 1 if the state is 0. This step measures first n qubits of each quantum register along the $|0\rangle$ direction to produce 1 conventional bit per register or 2M bits total.

8. Take the 2M output bits and determine an approximate count of events as given in equation 7.

In the illustrative example, a direct mapping of algorithm to quantum arithmetic logic unit (QALU) can require quantum registers of width L(E)+2. If this register length is bigger than the available quantum register width (b), the illustrative example can be modified to accommodate this situation. For example, an event vector can be split into P equal sub vectors of length L(E)/P, wherein L(E) is the length of the event vector. In this example, assume that b≥L(E)=P+2. Then, the illustrative example can operate on these smaller event vectors in the available register widths and produce a final approximate count. This operation can be performed by an encoding function that would operate in parallel on each P event sub vector $\{E_p\}_{p=1,\ldots,P}$ to produce a collection of P encoded functions $\{f_p\}$ and $\{f_p^c\}$ for p=1, . . . , P.

The quantum algorithm would be implemented on P collections of 2M registers which would produce P sub counts for each of the 2M registers. The final count can be determined by adding the P sub counts together as part of the output programmable logic.

Figure 15:
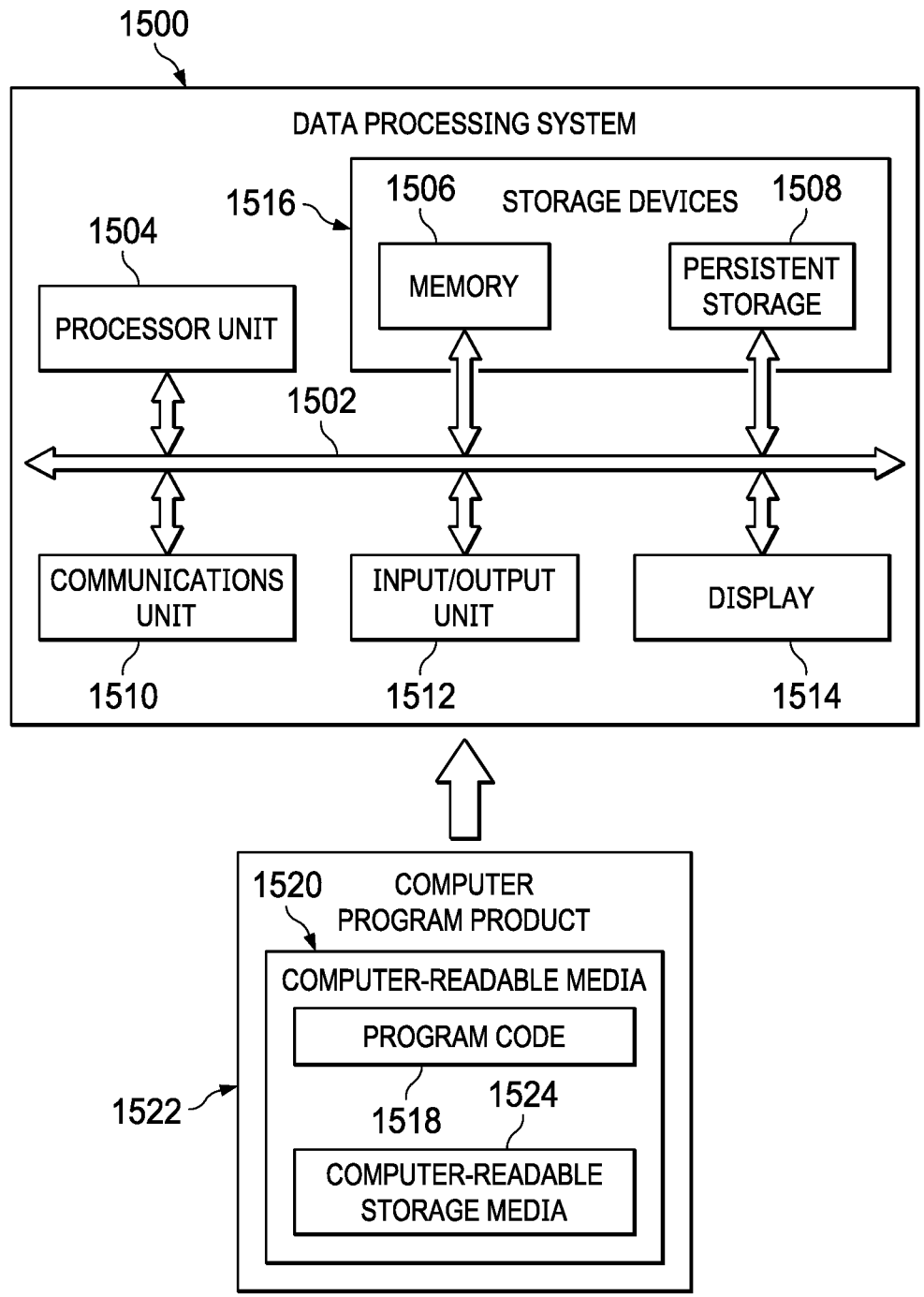
FIG. 15 is an illustration of a block diagram of a data processing system in accordance with an illustrative embodiment.

Turning now to FIG. 15, an illustration of a block diagram of a data processing system is depicted in accordance with an illustrative embodiment. Data processing system 1500 can also be used to implement computer system 120 in FIG. 1. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can may be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, can be, for example, a random-access memory or any other suitable volatile or non-volatile storage device. Persistent storage 1508 can take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 can provide a connection for user input through at least one of a keyboard, a mouse, or some other suitable input device. Further, input/output unit 1512 can send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which can be located in a memory, such as memory 1506.

These instructions are referred to as program code, computer usable program code, or computer-readable program code that can be read and executed by a processor in processor unit 1504. The program code in the different embodiments can be embodied on different physical or computer-readable storage media, such as memory 1506 or persistent storage 1508.

Program code 1518 is located in a functional form on computer-readable media 1520 that is selectively removable and can be loaded onto or transferred to data processing system 1500 for execution by processor unit 1504. Program code 1518 and computer-readable media 1520 form computer program product 1522 in these illustrative examples. In the illustrative example, computer-readable media 1520 is computer-readable storage media 1524.

In these illustrative examples, computer-readable storage media 1524 is a physical or tangible storage device used to store program code 1518 rather than a media that propagates or transmits program code 1518. Computer readable storage media 1524, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1518 can be transferred to data processing system 1500 using a computer-readable signal media. The computer-readable signal media can be, for example, a propagated data signal containing program code 1518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media" 1520 can be singular or plural. For example, program code 1518 can be located in computer-readable media 1520 in the form of a single storage device or system. In another example, program code 1518 can be located in computer-readable media 1520 that is distributed in multiple data processing systems. In other words, some instructions in program code 1518 can be located in one data processing system while other instructions in program code 1518 can be located in one data processing system. For example, a portion of program code 1518 can be located in computer-readable media 1520 in a server computer while another portion of program code 1518 can be located in computer-readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, can be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program code 1518.

Figure 16:
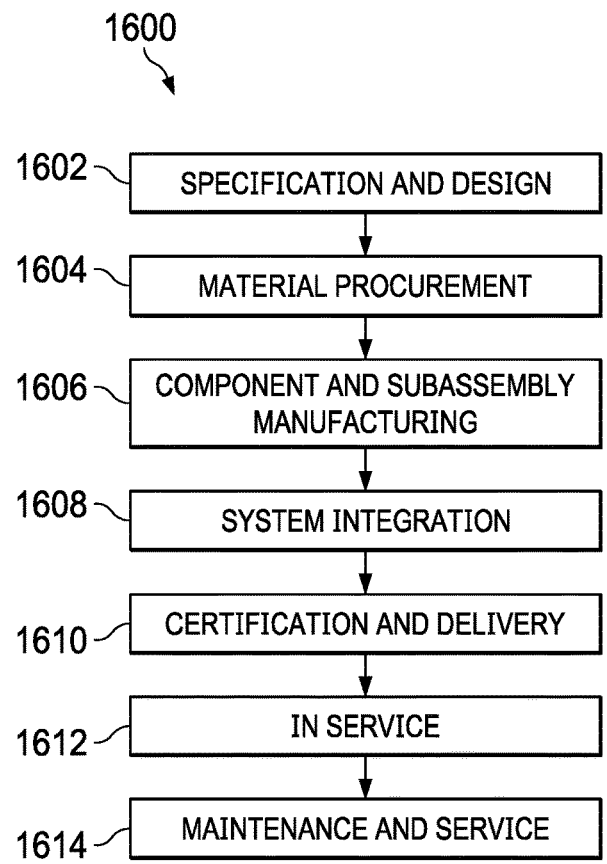
FIG. 16 is an illustration of an aircraft manufacturing and service method in accordance with an illustrative embodiment.
Figure 17:
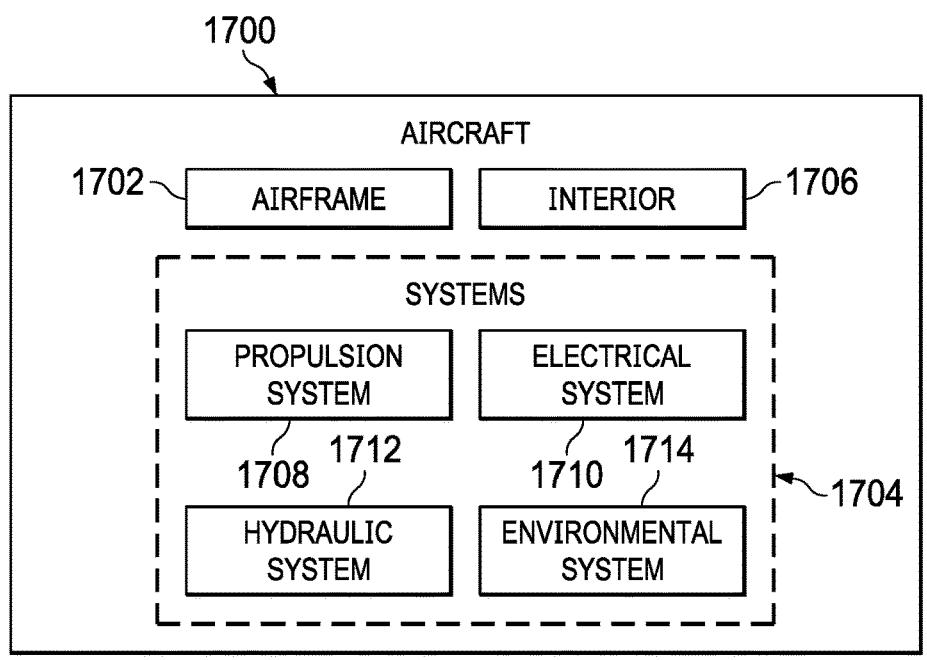
FIG. 17 is an illustration of a block diagram of an aircraft in which an illustrative embodiment may be implemented.

Illustrative embodiments of the disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During preproduction, aircraft manufacturing and service method 1600 may include specification and design 1602 of aircraft 1700 in FIG. 17 and material procurement 1604.

During production, component and subassembly manufacturing 1606 and system integration 1608 of aircraft 1700 in FIG. 17 takes place. Thereafter, aircraft 1700 in FIG. 17 can go through certification and delivery 1610 in order to be placed. While in service 1612 by a customer, aircraft 1700 in FIG. 17 is scheduled for routine maintenance and service 1614, which may include modification, reconfiguration, refurbishment, and other maintenance or service.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1600 in FIG. 16. For example, event can systems such as event counting system 106 can be implemented in aircraft 1700. This implementation can be performed as part of the manufacturing of aircraft 1700. In another illustrative example, event counting system 106 in FIG. 1 can be implemented during maintenance and service 1614, which may include modification, reconfiguration, refurbishment, and other maintenance or service. The use of event counting system 106 can improve the ability to count events for at least one of systems in aircraft 1700 or the environment around aircraft 1700 during in service 1612.

In one illustrative example, components or subassemblies produced in component and subassembly manufacturing 1606 in FIG. 16 can be fabricated or manufactured in a manner similar to components or subassemblies produced while aircraft 1700 is in service 1612 in FIG. 16. As yet another example, one or more apparatus embodiments, method embodiments, or a combination thereof can be utilized during production stages, such as component and subassembly manufacturing 1606 and system integration 1608 in FIG. 16. One or more apparatus embodiments, method embodiments, or a combination thereof may be utilized while aircraft 1700 is in service 1612, during maintenance and service 1614 in FIG. 16, or both. The use of a number of the different illustrative embodiments may substantially expedite the assembly of aircraft 1700, reduce the cost of aircraft 1700, or both expedite the assembly of aircraft 1700 and reduce the cost of aircraft 1700.

Some features of the illustrative examples are described in the following clauses. These clauses are examples of features not intended to limit other illustrative examples.

Clause 1: An event counting system comprising: a computer system; and a quantum processor in the computer system, wherein the quantum processor is configured to: reset a set of quantum registers; apply a Hadamard operator to the set of quantum registers; execute a quantum instruction on the set of quantum registers, wherein the quantum instruction incorporates a function for an event vector comprising events identified by bits; apply the Hadamard operator to the set of quantum registers after executing the quantum instruction; measure the set of quantum registers to form a measurement of the set of quantum registers; and determine an approximate count of the events using the measurement of the set of quantum registers.

Clause 2: The event counting system according to clause 1, wherein the quantum processor is configured to: encode the events into the event vector with the bits.

Clause 3: The event counting system according to one of clauses 1 or 2, wherein the quantum processor is configured to: generate the function for the event vector based on the event vector comprising the events identified by the bits.

Clause 4: The event counting system according to one of clauses 1, 2, or 3, wherein the quantum processor is configured to: generate the quantum instruction incorporating the function for the event vector comprising the events identified by the bits.

Clause 5: The event counting system according to one of clauses 1, 2, 3, or 4, wherein in determining the approximate count of the events using the measurement of the set of quantum registers, the quantum processor is configured to: determine the approximate count of the events as:

$$C(E)=F^{-1}C(r)/M$$

where C(r) is a count of logic ones in a measurement vector in the measurement, M is a number of quantum registers and $F^{-1}$ is an inverse of F(c) which is as follows:

$$F(c) = \left(\left(\sum_{i=c+1}^{L(E)} 2^i\right) \Big/ 2^n\right)^2$$

where L(E) is a length of the event vector, i is an index value, n is a number of qbits, c is an event count.

Clause 6: The event counting system according to one of clauses 1, 2, 3, 4, or 5, wherein the measurement of the set of quantum registers is a measurement vector that is M bits long, wherein M is how many quantum registers are preset in the set of quantum registers, and wherein in determining the approximate count of the events using the measurement of the set of quantum registers, the quantum processor is configured to: determine the approximate count of the events using a lookup table that identifies the approximate count of the events from a number of logic 1s in a measurement vector in the measurement.

Clause 7: The event counting system according to one of clauses 1, 2, 3, 4, 5, or 6, wherein the function performs a logic AND of first set of bits in a quantum register that corresponds to a second set of bits in the event vector that indicate a presence of an event.

Clause 8: The event counting system according to one of clauses 1, 2, 3, 4, 5, 6, or 7, wherein the function is as follows:

$$f(x)=(\wedge_{i=1}^{n} x_i^{E_i})$$

wherein $E_i$ is an ith bit in the event vector, n is a number of bits in the event vector, $X_i$ is the ith bit in the quantum register, and i is an index value.

Clause 9: The event counting system according to one of clauses 1, 2, 3, 4, 5, 6, 7, or 8, wherein the set of quantum registers is a first set of quantum registers, the measurement of the set of quantum registers is a first measurement of the first set of quantum registers and wherein the quantum processor is configured to: reset a second set of quantum registers; apply the Hadamard operator to the second set of quantum registers; execute a complementary quantum instruction on the second set of quantum registers, wherein the complementary quantum instruction incorporates a complementary function that is complementary to the function for the event vector comprising the events identified by the bits; apply the Hadamard operator to the second set of quantum registers after executing the complementary quantum instruction; and measure the second set of quantum registers to form a second measurement of the second set of quantum registers, wherein in determining the approximate count of the events using the measurement of the set of quantum registers, the quantum processor is configured to: determine the approximate count of the events using the first measurement of the first set of quantum registers and the second measurement of the second set of quantum registers.

Clause 10: The event counting system according to clause 9, wherein the complementary function is as follows:

$$f_c(x) = \left(\bigwedge_{i=1}^{n} x_i^{not(E_i)}\right)$$

where $E_i$ is an ith bit in the event vector, n is a number of bits in the event vector $X_i$ is the ith bit in the quantum register, and i is an index value.

Clause 11: The event counting system according clause 9 or 10, wherein in determining the approximate count of the events using the first measurement of the first set of quantum registers and the second measurement of the second set of quantum registers, the quantum processor is configured to: determine the approximate count of the events using the first measurement of the first set of quantum registers and the second measurement of the second set of quantum registers as follows:

$$C(E) \approx G^{-1}\left(\frac{C(r_1) - C(r_2)}{M}\right)$$

where $G^{-1}$ is the inverse of:

$$G(c) = \left(\left(\sum_{i=c+1}^{L(E)} 2^i\right)\Big/2^n\right)^2 - \left(\left(\sum_{i=n-c}^{L(E)} 2^i\right)\Big/2^n\right)^2$$

and has an inverse $G^{-1}$ that produces an approximate count of the events given probabilities as in $C(E)=G^{-1}(p(E)-p^c(E))$, where n is a number of qubits used in set of quantum registers, c(r1) is a first count of logic 1s in a first measurement vector in a first measurement, c(r2) is a second count of logic 1s in a second measurement vector in a second measurement, M is a number of quantum registers, L(E) is a length of the event vector, c is an event count, and i is an index value.

Clause 12: The event counting system according to one of clauses 1, 2, 3, 4, 5, 6, 7, 8, 9, 10, or 11, wherein the function is incorporated into the quantum instruction enabling the function to be performed by the quantum process when the quantum instruction is executed.

Clause 13: The event counting system according to one of clauses 1, 2, 3, 4, 5, 6, 7, 8, 9, 10, 11, or 12, wherein the quantum instruction comprises the function encoded in a unitary operator that can be executed by the quantum processor.

Clause 14: The event counting system according to one of clauses 1, 2, 3, 4, 5, 6, 7, 8, 9, 10, 11, 12, or 13, wherein the quantum processor is a quantum arithmetic logic unit.

Clause 15: An event counting system comprising: a computer system; a first set of quantum registers in the computer system; a second set of quantum registers in the computer system; a quantum processor in the computer system, wherein the quantum processor is configured to: reset the first set of quantum registers and the second set of quantum registers; apply a Hadamard operator to the first set of quantum registers and the second set of quantum registers; execute a quantum instruction on the set of quantum registers, wherein the quantum instruction incorporates a function for an event vector comprising events identified by bits in the event vector; execute a complementary quantum instruction on the second set of quantum registers, wherein the complementary quantum instruction incorporates a complementary function that is complementary to the function for the event vector comprising the events identified by the bits in the event vector; apply the Hadamard operator to the first set of quantum registers after executing the quantum instruction; apply the Hadamard operator to the second set of quantum registers after executing the complementary quantum instruction; measure the first set of quantum registers and the second set of quantum registers to form a measurement of the first set of quantum registers and the second set of quantum registers; and determine an approximate count of the events using the measurement.

Clause 16: A method for counting events, the method comprising: resetting a set of quantum registers; applying a Hadamard operator to the set of quantum registers; executing a quantum instruction on the set of quantum registers, wherein the quantum instruction incorporates a function for an event vector comprising events identified by bits; applying the Hadamard operator to the set of quantum registers after executing the quantum instruction; measuring the set of quantum registers to form a measurement of the set of quantum registers; and determining an approximate count of the events using the measurement of the set of quantum registers.

Clause 17: The method according clause 16, further comprising: encoding the events into the event vector with the bits.

Clause 18: The method according to one of clauses 16 or 17 further comprising: generating the function for the event vector based on the event vector comprising the events identified by the bits.

Clause 19: The method according to one of clauses 16 17, or 18 further comprising: generating the quantum instruction incorporating the function for the event vector comprising the events identified by the bits.

Clause 20: The method according to one of clauses 16 17, 18, or 19, wherein determining the approximate count of the events using the measurement of the set of quantum registers comprises: determining the approximate count of the events as follows:

$$C(E) \approx G^{-1}\left(\frac{C(r_1) - C(r_2)}{M}\right)$$

where $G^{-1}$ is the inverse of:

$$G(c) = \left(\left(\sum_{i=c+1}^{L(E)} 2^i\right)/2^n\right)^2 - \left(\left(\sum_{i=n-c}^{L(E)} 2^i\right)/2^n\right)^2$$

and has an inverse $G^{-1}$ that produces an approximate count of the events given probabilities as in $C(E)=G^{-1}(p(E)-p^c(E))$, where n is a number of qubits used in set of quantum registers, c(r1) is a first count of logic 1s in a first measurement vector in a first measurement, c(r2) is a second count of logic 1s in a second measurement vector in a second measurement, M is a number of quantum registers, L(E) is a length of the event vector, c is an event count, and i is an index value.

Clause 21: The method according to one of clauses 16 17, 18, 19, or 20, wherein the measurement of the set of quantum registers is a measurement vector that is M bits long, wherein M is how many quantum registers are preset in the set of quantum registers, and wherein determining the approximate count of the events using the measurement of the set of quantum registers comprises: determining the approximate count of the events using a lookup table that identifies the approximate count of the events from a number of logic 1s in a measurement vector in the measurement.

Clause 22: The method according to one of clauses 16 17, 18, 19, 20, or 21, wherein the function performs a logic AND of bits in a quantum register that correspond to bits in the event vector that indicate a presence of an event.

Clause 23: The method according to one of clauses 16 17, 18, 19, 20, 21, or 22, wherein the function is as follows:

$$f(x) = (\wedge_{i=1}^{n} x_i^{E_i})$$

wherein $E_i$ is an ith bit in the event vector, n is a number of bits in the event vector, $X_i$ is the ith bit in the quantum register, and i is an index value.

Clause 24: The method according to one of clauses 16 17, 18, 19, 20, 21, 22, or 23, wherein the set of quantum registers is a first set of quantum registers, the measurement of the set of quantum registers is a first measurement of the first set of quantum registers and further comprising: resetting a second set of quantum registers; applying the Hadamard operator to the second set of quantum registers; executing a complementary quantum instruction on the second set of quantum registers, wherein the complementary quantum instruction incorporates a complementary function that is complementary to the function for the event vector comprising the events identified by the bits; applying the Hadamard operator to the second set of quantum registers after executing the complementary quantum instruction; and measuring the second set of quantum registers to form a second measurement of the second set of quantum registers, wherein determining the approximate count of the events using the measurement of the set of quantum registers comprises: determining the approximate count of the events using the first measurement of the first set of quantum registers and the second measurement of the second set of quantum registers.

Clause 25: The method according to clause 24, wherein the complementary function is as follows:

$$f_c(x) = \left(\bigwedge_{i=1}^{n} x_i^{not(E_i)}\right)$$

where $E_i$ is an ith bit in the event vector, n is a number of bits in the event vector $X_i$ is the ith bit in the quantum register, and i is an index value.

Clause 26: The method according to one of clauses 24 or 25, wherein determining the approximate count of the events using the first measurement of the first set of quantum registers and the second measurement of the second set of quantum registers comprises: determining the approximate count of the events using the first measurement of the first set of quantum registers and the second measurement of the second set of quantum registers as follows:

$$C(E) \approx G^{-1}\left(\frac{C(r_1) - C(r_2)}{M}\right)$$

where $G^{-1}$ is the inverse of:

$$G(c) = \left(\left(\sum_{i=c+1}^{L(E)} 2^i\right)/2^n\right)^2 - \left(\left(\sum_{i=n-c}^{L(E)} 2^i\right)/2^n\right)^2$$

and in which $G^{-1}$ produces an approximate count of the events given probabilities as in $C(E)=G^{-1}(p(E)-p^c(E))$, where n is a number of qubits used in set of quantum registers, c(r1) is a first count of logic 1s in a first measurement vector in a first measurement, c(r2) is a second count of logic 1s in a second measurement vector in a second measurement, M is a number of quantum registers, L(E) is a length if the event vector, c is an event count, and i is an index value.

Clause 27: The method according to one of clauses 16 17, 18, 19, 20, 21, 22, or 23, 24, 25, or 26, wherein the function is incorporated into the quantum instruction enabling the function to be performed by a quantum process when the quantum instruction is executed.

Thus, the illustrative examples provide a method, apparatus, and system for counting events. In one illustrative example, a set of quantum registers is reset. A Hadamard operator is applied to the set of quantum registers. A quantum instruction is executed on the set of quantum registers, wherein the quantum instruction incorporates a function for an event vector comprising events identified by bits. The Hadamard operator is applied to the set of quantum registers after executing the quantum instruction. The set of quantum registers is measured to form a measurement of the set of quantum registers. An approximate count of the events is determined using the measurement of the set of quantum registers.

The counting of events can be performed at frequencies higher than currently available techniques. In one illustrative example, an event counting system can include a quantum processor such as a quantum arithmetic logic unit. This quantum processor can count events from multiple sensors that individually produce the events at a rate that is faster than can be counted using current techniques. In other words, when the events are received from multiple sensors, the frequency may be greater than what current event counters can count events though events can be counted from individual sensors.

Further, the approximate count generated by the quantum processor can have a desired accuracy based on the selection and design of the quantum processor and other components. In this manner, the events can be counted at higher frequencies in larger numbers enabling processing of information from higher frequency sensors as compared to current techniques.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An event counting system comprising:
   a computer system; and
   a quantum processor in the computer system, wherein the quantum processor is configured to:
   reset a set of quantum registers;
   apply a Hadamard operator to the set of quantum registers;
   execute a quantum instruction on the set of quantum registers, wherein the quantum instruction incorporates a function for an event vector comprising events identified by bits;
   apply the Hadamard operator to the set of quantum registers after executing the quantum instruction;
   measure the set of quantum registers to form a measurement of the set of quantum registers; and
   determine an approximate count of the events using the measurement of the set of quantum registers, wherein the measurement of the set of quantum registers is a measurement vector that is M bits long, wherein M is how many quantum registers are preset in the set of quantum registers, and wherein in determining the approximate count of the events using the measurement of the set of quantum registers, the quantum processor is configured to:
   determine the approximate count of the events using a lookup table that identifies the approximate count of the events from a number of logic 1s in a measurement vector in the measurement.

2. The event counting system of claim 1, wherein the quantum processor is configured to:
   encode the events into the event vector with the bits.

3. The event counting system of claim 1, wherein the quantum processor is configured to:
   generate the function for the event vector based on the event vector comprising the events identified by the bits.

4. The event counting system of claim 1, wherein the quantum processor is configured to:
   generate the quantum instruction incorporating the function for the event vector comprising the events identified by the bits.

5. The event counting system of claim 1, wherein in determining the approximate count of the events using the measurement of the set of quantum registers, the quantum processor is configured to:
   determine the approximate count of the events as:

$C(E)=F^{-1}C(r)/M$ where C(r) is a count of logic ones in a measurement vector in the measurement, M is a number of quantum registers and $F^{-1}$ is an inverse of F(c) which is as follows:

$$F(c) = \left(\frac{\sum_{i=c+1}^{L(E)} 2^i}{2^n}\right)^2$$

where L(E) is a length of the event vector, i is an index value, n is a number of qbits, c is an event count.

6. The event counting system of claim 1, wherein the function performs a logic AND of first set of bits in a quantum register that corresponds to a second set of bits in the event vector that indicate a presence of an event.

7. The event counting system of claim 1, wherein the function is as follows:

$$f(x) = (\wedge_{i=1}^{n} [\![ x_i^{E_i} )]\!]$$

wherein $E_i$ is an ith bit in the event vector, n is a number of bits in the event vector, $X_i$ is the ith bit in the quantum register, and i is an index value.

8. The event counting system of claim 1, wherein the set of quantum registers is a first set of quantum registers, the measurement of the set of quantum registers is a first measurement of the first set of quantum registers and wherein the quantum processor is configured to:
reset a second set of quantum registers;
apply the Hadamard operator to the second set of quantum registers;
execute a complementary quantum instruction on the second set of quantum registers, wherein the complementary quantum instruction incorporates a complementary function that is complementary to the function for the event vector comprising the events identified by the bits;
apply the Hadamard operator to the second set of quantum registers after executing the complementary quantum instruction; and
measure the second set of quantum registers to form a second measurement of the second set of quantum registers;
wherein in determining the approximate count of the events using the measurement of the set of quantum registers, the quantum processor is configured to:
determine the approximate count of the events using the first measurement of the first set of quantum registers and the second measurement of the second set of quantum registers.

9. The event counting system of claim 8, wherein the complementary function is as follows:

$$f_c(x) = \left( \bigwedge_{i=1}^{n} x_i^{not(E_i)} \right)$$

where $E_i$ is an ith bit in the event vector, n is a number of bits in the event vector, $X_i$ is the ith bit in the quantum register, and i is an index value.

10. The event counting system of claim 8, wherein in determining the approximate count of the events using the first measurement of the first set of quantum registers and the second measurement of the second set of quantum registers, the quantum processor is configured to:
determine the approximate count of the events using the first measurement of the first set of quantum registers and the second measurement of the second set of quantum registers as follows:

$$C(E) \approx G^{-1}\left( \frac{C(r_1) - C(r_2)}{M} \right)$$

where $G^{-1}$ is an inverse of:

$$G(c) = \left( \frac{\sum_{i=c+1}^{L(E)} 2^i}{2^n} \right)^2 - \left( \frac{\sum_{i=n-c}^{L(E)} 2^i}{2^n} \right)^2$$

and has an inverse $G^{-1}$ that produces the approximate count of the events given probabilities as in $C(E) = G^{-1}(p(E) - p^c(E))$), where n is a number of qubits used in set of quantum registers, c(r1) is a first count of logic 1s in a first measurement vector in a first measurement, c(r2) is a second count of logic 1s in a second measurement vector in a second measurement, M is a number of quantum registers, L(E) is a length of the event vector, c is an event count, and i is an index value.

11. The event counting system of claim 1, wherein the function is incorporated into the quantum instruction enabling the function to be performed by the quantum process when the quantum instruction is executed.

12. The event counting system of claim 1, wherein the quantum instruction comprises the function encoded in a unitary operator that can be executed by the quantum processor.

13. The event counting system of claim 1, wherein the quantum processor is a quantum arithmetic logic unit.

14. An event counting system comprising:
a computer system;
a first set of quantum registers in the computer system;
a second set of quantum registers in the computer system; and
a quantum processor in the computer system, wherein the quantum processor is configured to:
reset the first set of quantum registers and the second set of quantum registers;
apply a Hadamard operator to the first set of quantum registers and the second set of quantum registers;
execute a quantum instruction on the first set of quantum registers, wherein the quantum instruction incorporates a function for an event vector comprising events identified by bits in the event vector;
execute a complementary quantum instruction on the second set of quantum registers, wherein the complementary quantum instruction incorporates a complementary function that is complementary to the function for the event vector comprising the events identified by the bits in the event vector;
apply the Hadamard operator to the first set of quantum registers after executing the quantum instruction;
apply the Hadamard operator to the second set of quantum registers after executing the complementary quantum instruction;
measure the first set of quantum registers to form a first measurement of the first set of quantum registers and measure the second set of quantum registers to form a second measurement of the second set of quantum registers; and
determine an approximate count of the events using the first measurement of the first set of quantum registers and the second measurement of the second set of quantum registers.

15. A method for counting events, the method comprising:
resetting a set of quantum registers;
applying a Hadamard operator to the set of quantum registers;
executing a quantum instruction on the set of quantum registers, wherein the quantum instruction incorporates a function for an event vector comprising events identified by bits;
applying the Hadamard operator to the set of quantum registers after executing the quantum instruction;
measuring the set of quantum registers to form a measurement of the set of quantum registers; and determining an approximate count of the events using the measurement of the set of quantum registers;
wherein the function performs a logic AND of bits in a quantum register that correspond to bits in the event vector that indicate a presence of an event.

16. The method of claim 15, further comprising:
encoding the events into the event vector with the bits.

17. The method of claim 15, further comprising:
generating the function for the event vector based on the event vector comprising the events identified by the bits.

18. The method of claim 15 further comprising:
generating the quantum instruction incorporating the function for the event vector comprising the events identified by the bits.

19. The method of claim 15, wherein determining the approximate count of the events using the measurement of the set of quantum registers comprises:
determining the approximate count of the events as follows:

$$C(E) \approx G^{-1}\left(\frac{C(r_1) - C(r_2)}{M}\right)$$

where $G^{-1}$ is an inverse of:

$$G(c) = \left(\frac{\sum_{i=c+1}^{L(E)} 2^i}{2^n}\right)^2 - \left(\frac{\sum_{i=n-c}^{L(E)} 2^i}{2^n}\right)^2$$

and has an inverse $G^{-1}$ that produces the approximate count of the events given probabilities as in $C(E)=G^{-1}(p(E)-p^c(E))$, where n is a number of qubits used in set of quantum registers, c(r1) is a first count of logic 1s in a first measurement vector in a first measurement, c(r2) is a second count of logic 1s in a second measurement vector in a second measurement, M is a number of quantum registers, L(E) is a length of the event vector, c is an event count, and i is an index value.

20. The method of claim 15, wherein the measurement of the set of quantum registers is a measurement vector that is M bits long, wherein M is how many quantum registers are preset in the set of quantum registers, and wherein determining the approximate count of the events using the measurement of the set of quantum registers comprises:
determining the approximate count of the events using a lookup table that identifies the approximate count of the events from a number of logic 1s in a measurement vector in the measurement.

21. The method of claim 15, wherein the function is as follows:

$$f(x)=(\wedge_{i=1}^n [\![ x_i^{E_i} ]\!])$$

wherein $E_i$ is an ith bit in the event vector, n is a number of bits in the event vector, $X_i$ is the ith bit in the quantum register, and i is an index value.

22. The method of claim 15, wherein the set of quantum registers is a first set of quantum registers, the measurement of the set of quantum registers is a first measurement of the first set of quantum registers and further comprising:
resetting a second set of quantum registers;
applying the Hadamard operator to the second set of quantum registers;
executing a complementary quantum instruction on the second set of quantum registers, wherein the complementary quantum instruction incorporates a complementary function that is complementary to the function for the event vector comprising the events identified by the bits;
applying the Hadamard operator to the second set of quantum registers after executing the complementary quantum instruction; and
measuring the second set of quantum registers to form a second measurement of the second set of quantum registers,
wherein determining the approximate count of the events using the measurement of the set of quantum registers comprises:
determining the approximate count of the events using the first measurement of the first set of quantum registers and the second measurement of the second set of quantum registers.

23. The method of claim 22, wherein the complementary function is as follows:

$$f_c(x) = \left(\bigwedge_{i=1}^n x_i^{not(E_i)}\right)$$

where $E_i$ is an ith bit in the event vector, n is a number of bits in the event vector, $X_i$ is the ith bit in the quantum register, and i is an index value.

24. The method of claim 22, wherein determining the approximate count of the events using the first measurement of the first set of quantum registers and the second measurement of the second set of quantum registers comprises:
determining the approximate count of the events using the first measurement of the first set of quantum registers and the second measurement of the second set of quantum registers as follows:

$$C(E) \approx G^{-1}\left(\frac{C(r_1) - C(r_2)}{M}\right)$$

where $G^{-1}$ is an inverse of:

$$G(c) = \left(\frac{\sum_{i=c+1}^{L(E)} 2^i}{2^n}\right)^2 - \left(\frac{\sum_{i=n-c}^{L(E)} 2^i}{2^n}\right)^2$$

and in which $G^{-1}$ produces the approximate count of the events given probabilities as in $C(E)=G^{-1}(p(E)-p^c(E))$, where n is a number of qubits used in set of quantum registers, c(r1) is a first count of logic 1s in a first measurement vector in a first measurement, c(r2) is a second count of logic 1s in a second measurement vector in a second measurement, M is a number of quantum registers, L(E) is a length if the event vector, c is an event count, and i is an index value.

25. The method of claim 15, wherein the function is incorporated into the quantum instruction enabling the function to be performed by a quantum process when the quantum instruction is executed.

26. An event counting system comprising:
a computer system; and
a quantum processor in the computer system, wherein the quantum processor is configured to:
reset a set of quantum registers;
apply a Hadamard operator to the set of quantum registers;
execute a quantum instruction on the set of quantum registers, wherein the quantum instruction incorporates a function for an event vector comprising events identified by bits;
apply the Hadamard operator to the set of quantum registers after executing the quantum instruction;
measure the set of quantum registers to form a measurement of the set of quantum registers; and
determine an approximate count of the events using the measurement of the set of quantum registers, wherein in determining the approximate count of the events using the measurement of the set of quantum registers, the quantum processor is configured to:
determine the approximate count of the events as:

$$C(E) = F^{-1}C(r)/M$$

where C (r) is a count of logic ones in a measurement vector in the measurement, M is a number of quantum registers and $F^{-1}$ is an inverse of F (c) which is as follows:

$$F(c) = \left(\frac{\sum_{i=c+1}^{L(E)} 2^i}{2^n}\right)^2$$

where L(E) is a length of the event vector, i is an index value, n is a number of qbits, c is an event count.

27. An event counting system comprising:
a computer system; and
a quantum processor in the computer system, wherein the quantum processor is configured to:
reset a set of quantum registers;
apply a Hadamard operator to the set of quantum registers;
execute a quantum instruction on the set of quantum registers, wherein the quantum instruction incorporates a function for an event vector comprising events identified by bits;
apply the Hadamard operator to the set of quantum registers after executing the quantum instruction;
measure the set of quantum registers to form a measurement of the set of quantum registers; and
determine an approximate count of the events using the measurement of the set of quantum registers;
wherein the function is as follows:

$$f(x) = (\wedge_{i=1}^{n} [\![ x_i^{E_i}) ]\!]$$

wherein $E_i$ is an ith bit in the event vector, n is a number of bits in the event vector, $X_i$ is the ith bit in the quantum register, and i is an index value.

28. A method for counting events, the method comprising:
resetting a set of quantum registers;
applying a Hadamard operator to the set of quantum registers;
executing a quantum instruction on the set of quantum registers, wherein the quantum instruction incorporates a function for an event vector comprising events identified by bits;
applying the Hadamard operator to the set of quantum registers after executing the quantum instruction;
measuring the set of quantum registers to form a measurement of the set of quantum registers; and
determining an approximate count of the events using the measurement of the set of quantum registers, wherein determining the approximate count of the events using the measurement of the set of quantum registers comprises:
determining the approximate count of the events as follows:

$$C(E) \approx G^{-1}\left(\frac{C(r_1) - C(r_2)}{M}\right)$$

where $G^{-1}$ is an inverse of:

$$G(c) = \left(\frac{\sum_{i=c+1}^{L(E)} 2^i}{2^n}\right)^2 - \left(\frac{\sum_{i=n-c}^{L(E)} 2^i}{2^n}\right)^2$$

and has an inverse $G^{-1}$ that produces the approximate count of the events given probabilities as in C(E)=$G^{-1}$(p(E)–$p^c$(E)), where n is a number of qubits used in set of quantum registers, c(r1) is a first count of logic 1s in a first measurement vector in a first measurement, c(r2) is a second count of logic 1s in a second measurement vector in a second measurement, M is a number of quantum registers, L(E) is a length of the event vector, c is an event count, and i is an index value.

29. A method for counting events, the method comprising:
resetting a set of quantum registers;
applying a Hadamard operator to the set of quantum registers;
executing a quantum instruction on the set of quantum registers, wherein the quantum instruction incorporates a function for an event vector comprising events identified by bits;
applying the Hadamard operator to the set of quantum registers after executing the quantum instruction;
measuring the set of quantum registers to form a measurement of the set of quantum registers; and
determining an approximate count of the events using the measurement of the set of quantum registers;
wherein the function is as follows:

$$f(x) = (\wedge_{i=1}^{n} [\![ x_i^{E_i}) ]\!]$$

wherein $E_i$ is an ith bit in the event vector, n is a number of bits in the event vector, $X_i$ is the ith bit in the quantum register, and i is an index value.

* * * * *

UNITED STATES PATENT AND TRADEMARK OFFICE
CERTIFICATE OF CORRECTION

| | |
|---|---|
| PATENT NO. | : 12,198,004 B2 |
| APPLICATION NO. | : 17/453359 |
| DATED | : January 14, 2025 |
| INVENTOR(S) | : Gary A. Ray |

It is certified that error appears in the above-identified patent and that said Letters Patent is hereby corrected as shown below:

In the Claims

Column 31, Line 61, correct "where G-1 is an" to read -- where $G^{-1}$ is an --

Column 34, Line 62, correct "a length if the event," to read -- a length of the event, --

Column 36, Lines 32 and 33, correct "as in C(E)=G—1(p(E)-p^c(E))," to read -- $C(E)=G^{-1}(p(E)-p^{\wedge}c(E))$, --

Signed and Sealed this
Fifteenth Day of April, 2025

Coke Morgan Stewart
*Acting Director of the United States Patent and Trademark Office*